(12) United States Patent
Park et al.

(10) Patent No.: US 12,229,442 B2
(45) Date of Patent: Feb. 18, 2025

(54) STORAGE DEVICE AND METHOD OF OPERATION THEREOF

(71) Applicant: SAMSUNG ELECTRONICS CO., LTD., Suwon-si (KR)

(72) Inventors: Youngwoo Park, Cheonan-si (KR); Taeduk Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 17/708,771

(22) Filed: Mar. 30, 2022

(65) Prior Publication Data

US 2023/0007903 A1 Jan. 12, 2023

(30) Foreign Application Priority Data

Jul. 8, 2021 (KR) .................. 10-2021-0089918

(51) Int. Cl.
*G06F 3/06* (2006.01)

(52) U.S. Cl.
CPC .......... *G06F 3/0659* (2013.01); *G06F 3/0604* (2013.01); *G06F 3/0632* (2013.01); *G06F 3/0635* (2013.01); *G06F 3/0673* (2013.01)

(58) Field of Classification Search
CPC .... G06F 3/0659; G06F 3/0604; G06F 3/0632; G06F 3/0635; G06F 3/0673
See application file for complete search history.

(56) References Cited

U.S. PATENT DOCUMENTS

| | | | |
|---|---|---|---|
| 6,745,268 B1 * | 6/2004 | Greeff | G06F 13/4086 |
| | | | 327/109 |
| 7,119,436 B2 | 10/2006 | Lien | |
| 8,159,886 B2 | 4/2012 | Miyamoto et al. | |
| 9,740,412 B2 | 8/2017 | Jung et al. | |
| 9,760,482 B2 * | 9/2017 | Hashimoto | G06F 12/0246 |
| 10,002,853 B2 | 6/2018 | Oh | |
| 10,482,935 B2 | 11/2019 | Park et al. | |
| 2004/0148482 A1 * | 7/2004 | Grundy | G06F 13/4256 |
| | | | 711/104 |
| 2008/0173995 A1 | 7/2008 | Kuratomi et al. | |

(Continued)

FOREIGN PATENT DOCUMENTS

| | | |
|---|---|---|
| JP | 5-89304 A | 4/1993 |
| KR | 20-0404069 Y1 | 12/2005 |
| KR | 10-1898191 B1 | 9/2018 |

*Primary Examiner* — Gurtej Bansal
(74) *Attorney, Agent, or Firm* — Sughrue Mion, PLLC

(57) ABSTRACT

A storage device, including a printed circuit board including a connector including a plurality of pins capable of being coupled to an external host device, a controller socket, a first slot, a second slot, a third slot, and a fourth slot; a first universal flash storage (UFS) device, a second UFS device, a third UFS device, and a fourth UFS device, wherein each UFS device of the first to fourth UFS devices is removably installed in a corresponding slot of the first to fourth slots; and a storage controller mounted in the controller socket, and configured to control the first to fourth UFS devices, wherein the first UFS device and the second UFS device are configured to communicate with the storage controller through a first channel, and the third UFS device and the fourth UFS device are configured to communicate with the storage controller through a second channel.

20 Claims, 15 Drawing Sheets

(56) References Cited

U.S. PATENT DOCUMENTS

| | | | |
|---|---|---|---|
| 2009/0282195 A1* | 11/2009 | Wang | G06F 3/0607 |
| | | | 711/E12.001 |
| 2013/0094271 A1* | 4/2013 | Schuetz | G06F 13/4234 |
| | | | 365/63 |
| 2014/0095948 A1* | 4/2014 | Kochar | G11C 29/56 |
| | | | 714/718 |
| 2017/0199673 A1* | 7/2017 | Park | G06F 3/0688 |
| 2018/0286466 A1 | 10/2018 | Han et al. | |
| 2022/0053651 A1 | 2/2022 | Park | |

* cited by examiner

STORAGE DEVICE AND METHOD OF OPERATION THEREOF

CROSS-REFERENCE TO RELATED APPLICATIONS

This application claims priority under 35 U.S.C. § 119 to Korean Patent Application No. 10-2021-0089918 filed on Jul. 8, 2021, in the Korean Intellectual Property Office, the disclosure of which is incorporated by reference herein in its entirety.

BACKGROUND

Field

Provided are a semiconductor memory, and more particularly, a storage device and an operation method thereof.

Description of Related Art

A semiconductor memory device may be classified as a volatile memory device, in which stored data disappear when a power supply is turned off, such as a static random access memory (SRAM) or a dynamic random access memory (DRAM), or a nonvolatile memory device, in which stored data are retained even when a power supply is turned off, such as a flash memory device, a phase-change RAM (PRAM) device, a magnetic RAM (MRAM) device, a resistive RAM (RRAM) device, or a ferroelectric RAM (FRAM) device.

Flash memory devices may be widely used as a high-capacity storage medium in a computing device. For example, various technologies for supporting a high-speed operation of the flash memory device are being developed. In particular, a universal flash storage (UFS) interface defined by the Joint Electron Device Engineering Council (JEDEC) standard may support an operating speed higher than that of a conventional flash memory based storage device.

SUMMARY

Provided are a storage device with improved performance and an operation method thereof.

Additional aspects will be set forth in part in the description which follows and, in part, will be apparent from the description, or may be learned by practice of the presented embodiments.

In accordance with an aspect of the disclosure, a storage device includes a printed circuit board including a connector including a plurality of pins capable of being coupled to an external host device, a controller socket, a first slot, a second slot, a third slot, and a fourth slot; a first universal flash storage (UFS) device, a second UFS device, a third UFS device, and a fourth UFS device, wherein each UFS device of the first to fourth UFS devices is removably installed in a corresponding slot of the first to fourth slots; and a storage controller mounted in the controller socket, and configured to control the first to fourth UFS devices, wherein the first UFS device and the second UFS device are configured to communicate with the storage controller through a first channel, and the third UFS device and the fourth UFS device are configured to communicate with the storage controller through a second channel.

In accordance with an aspect of the disclosure, an operation method of a storage device which includes a plurality of universal flash storage (UFS) devices which are removable from the storage device, and a storage controller includes receiving, by the storage controller, a detection signal based on a new UFS device of the plurality of UFS devices being inserted; performing, by the storage controller, an initialization operation with the new UFS device in response to the detection signal; storing, by the storage controller, status information in a memory after performing the initialization operation; and transmitting, by the storage controller, the status information to an external host, wherein the status information includes information about the plurality of UFS devices and information about a size of a storage space.

In accordance with an aspect of the disclosure, a storage device includes a printed circuit board including a connector including a plurality of pins capable of being coupled to an external host device, a controller socket, a first slot, a second slot, a third slot, and a fourth slot, and a plurality of memory sockets; a first universal flash storage (UFS) device, a second UFS device, a third UFS device, and a fourth UFS device, wherein each UFS device of the first to fourth UFS devices is removably installed in a corresponding slot of the first to fourth slots; a plurality of nonvolatile memory devices mounted in the plurality of memory sockets; and a storage controller mounted in the controller socket, and including a UFS interface circuit configured to control the first to fourth UFS devices and a nonvolatile memory interface circuit configured to control the plurality of nonvolatile memory devices, wherein the first UFS device and the second UFS device communicate with the storage controller through a first channel, and the third UFS device and the fourth UFS device communicate with the storage controller through a second channel.

In accordance with an aspect of the disclosure, a storage device includes a printed circuit board including a connector including a plurality of pins capable of being coupled to an external host device, a controller socket, a first slot, and a second slot; a first universal flash storage (UFS) device removably installed in the first slot, and a second UFS device removably installed in the second slot; and a storage controller mounted in the controller socket, and configured to control the first UFS device and to the second UFS device, wherein the first UFS device is configured to communicate with the storage controller through a first channel, and the second UFS device is configured to communicate with the storage controller through a second channel.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Below, embodiments of the present disclosure will be described in detail and clearly to such an extent that one skilled in the art may carry out the present disclosure.

Components described in the specification by using the terms "part", "unit", "module", "engine", etc. and function blocks illustrated in drawings may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Also, unless defined otherwise, all terms used herein, which include technical terminologies or scientific terminologies, have the same meaning as that understood by a person skilled in the art to which the disclosure belongs. Terms defined in a generally used dictionary may be interpreted to have meanings equal to the contextual meanings in a relevant technical field, and are not interpreted to have ideal or excessively formal meanings unless clearly defined in the specification.

Figure 1:
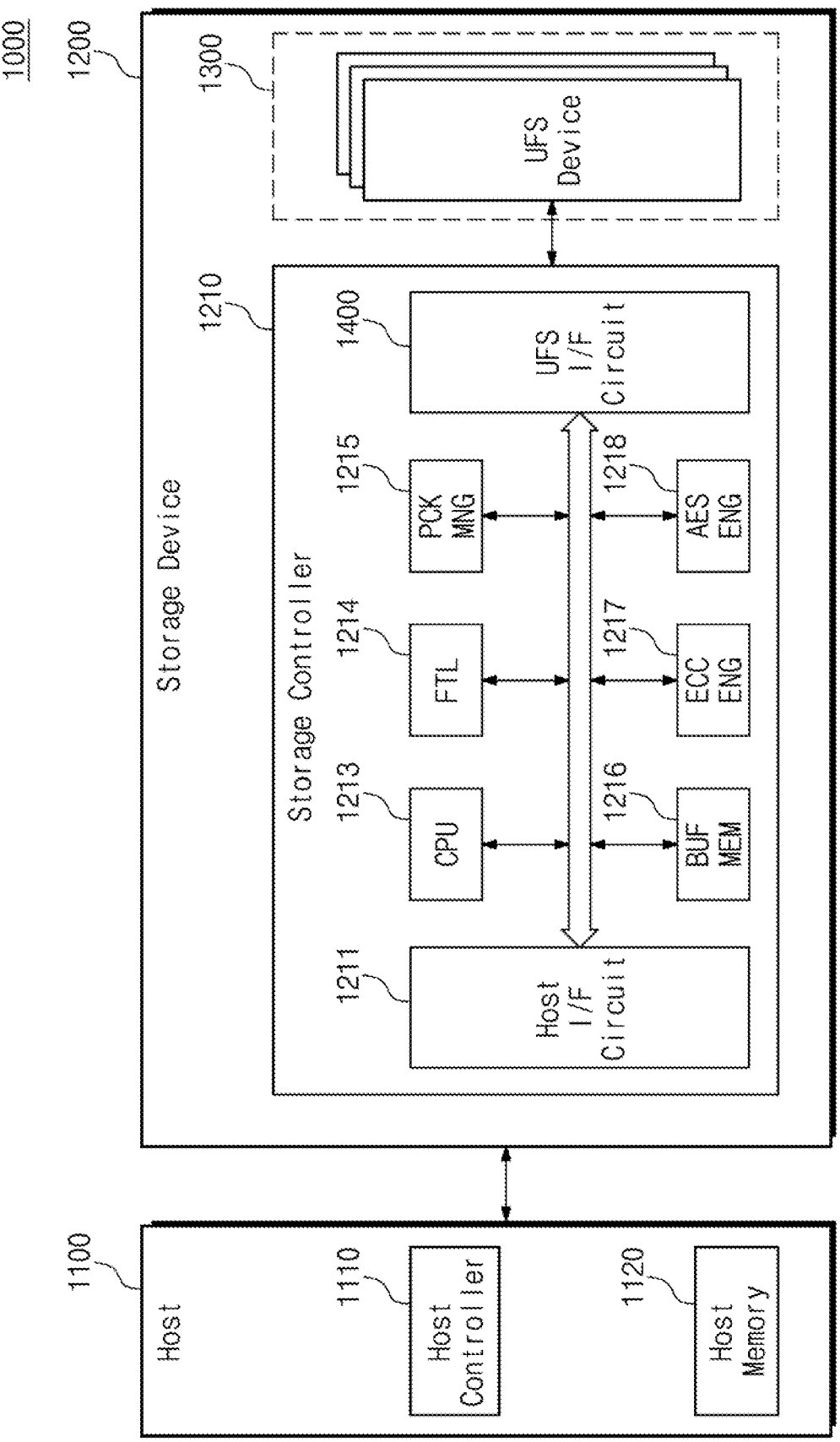
FIG. 1 is a block diagram illustrating a host-storage system according to an embodiment.

FIG. 1 is a block diagram illustrating a host-storage system 1000 according to an embodiment of the present disclosure. The host-storage system 1000 may include a host 1100 and a storage device 1200. The storage device 1200 may include a storage controller 1210 and a plurality of universal flash storage (UFS) devices 1300. According to an embodiment of the present disclosure, the host 1100 may include a host controller 1110 and a host memory 1120. The host memory 1120 may function as a buffer memory for temporarily storing data to be transmitted to the storage device 1200 or data transmitted from the storage device 1200.

The storage device 1200 may include storage mediums for storing data depending on a request from the host 1100. As an example, the storage device 1200 may include at least one of a solid state drive (SSD), an embedded memory, and a removable external memory. In the case where the storage device 1200 is an SSD, the storage device 1200 may be a device complying with the non-volatile memory express (NVMe) standard. In the case where the storage device 1200 is an embedded memory or an external memory, the storage device 1200 may be a device complying with the universal flash storage (UFS) or embedded multi-media card (eMMC) standard. Each of the host 1100 and the storage device 1200 may generate a packet complying with a standard protocol applied thereto and may transmit the generated packet.

The storage device 1200 may include an attachable or detachable external memory. In particular, the storage device 1200 may include the plurality of UFS devices 1300 that may be one or more of removable, attachable, or detachable. When each of the plurality of UFS devices 1300 includes a flash memory, the flash memory may include a two-dimensional (2D) NAND flash memory array or a three-dimensional (3D) NAND or vertical NAND (VNAND) memory array. As another example, the storage device 1200 may include various heterogeneous nonvolatile memories. For example, the storage device 1200 may include a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), or at least one of various kinds of different memories.

According to an embodiment, the host controller 1110 and the host memory 1120 may be implemented with separate semiconductor chips. In some embodiments, the host controller 1110 and the host memory 1120 may be implemented in the same semiconductor chip. As an example, the host controller 1110 may be one of a plurality of modules included in an application processor; in this case, the application processor may be implemented with a system on chip (SoC). Also, the host memory 1120 may be an embedded memory included in the application processor or may be a nonvolatile memory or a memory module disposed outside the application processor.

The host controller 1110 may manage an operation of storing data (e.g., write data) of a buffer region of the host memory 1120 in the plurality of UFS devices 1300 or storing data (e.g., read data) of the plurality of UFS devices 1300 in the buffer region.

The storage controller 1210 may include a host interface circuit 1211, a UFS interface circuit 1400, and a central processing unit (CPU) 1213. Also, the storage controller 1210 may further include a flash translation layer (FTL) 1214, a packet manager 1215 (illustrated as "PCK MNG"), a buffer memory 1216 (illustrated as "BUF MEM"), an error correction code (ECC) engine 1217 (illustrated as "ECC ENG"), and an advanced encryption standard (AES) engine 1218 (illustrated as "AES ENG"). The storage controller 1210 may further include a working memory onto which the flash translation layer 1214 is loaded, and data write and read operations associated with the plurality of UFS devices 1300 may be controlled as the CPU 1213 executes the flash translation layer 1214. That is, the storage controller 1210 may be configured to control the plurality of UFS devices 1300 that may be one or more of removable, attachable, or detachable.

The CPU 1213 may generate an input-output request IOR for the purpose of an input and an output associated with the plurality of UFS devices 1300. The input-output request IOR may mean a data read request, a data write request, and/or a data discard (or unmap) request, but the present disclosure is not limited thereto. The CPU 1213 may transmit the input-output request IOR to the UFS interface circuit 1400.

The host interface circuit 1211 may exchange packets with the host 1100. A packet that is transmitted from the host 1100 to the host interface circuit 1211 may include a command or data to be written in the plurality of UFS devices 1300, and a packet that is transmitted from the host interface circuit 1211 to the host 1100 may include a response to the command or data read from the plurality of UFS devices 1300. The UFS interface circuit 1400 may provide the plurality of UFS devices 1300 with data to be written in the plurality of UFS devices 1300 or may receive data read from the plurality of UFS devices 1300. The UFS interface circuit 1400 may be implemented to comply with a standard protocol such as Joint Electron Device Engineering Council (JEDEC) UFS.

Below, for convenience of description, the terms "command", "request", "packet", "command", and the like may be interchangeably used. The terms may have the same meaning or different meanings depending on the context of embodiments, and the meaning of each term may be understood depending on the context of embodiments to be described.

The flash translation layer 1214 may perform various functions such as address mapping, wear-leveling, and garbage collection. The address mapping operation refers to an operation of translating a logical address received from the host 1100 into a physical address to be used to actually store data in the plurality of UFS devices 1300. The wear-leveling that is a technology for allowing blocks in the plurality of UFS devices 1300 to be used uniformly such that excessive degradation of a specific block is prevented may be implemented, for example, through a firmware technology for balancing erase counts of physical blocks. The garbage collection refers to a technology for securing an available capacity of the plurality of UFS devices 1300 through a way to erase an existing block after copying valid data of the existing block to a new block.

The packet manager 1215 may generate a packet complying with a protocol of an interface agreed with the host 1100 or may parse various kinds of information from the packet received from the host 1100. Also, the buffer memory 1216 may temporarily store data to be written in the plurality of UFS devices 1300 or data read from the plurality of UFS devices 1300. The buffer memory 1216 may be a component provided within the storage controller 1210; however, it may be possible to dispose the buffer memory 1216 outside the storage controller 1210.

The ECC engine 1217 may perform an error detection and correction function on data read from the plurality of UFS devices 1300. In more detail, the ECC engine 1217 may generate parity bits for write data to be written in the plurality of UFS devices 1300, and the parity bits thus generated may be stored in the plurality of UFS devices 1300 together with the write data. When data are read from the plurality of UFS devices 1300, the ECC engine 1217 may correct an error of the read data by using parity bits read from the plurality of UFS devices 1300 together with the read data and may output the error-corrected read data.

The AES engine 1218 may perform at least one of an encryption operation and a decryption operation on data input to the storage controller 1210 by using a symmetric-key algorithm.

The storage device 1200 may include the plurality of UFS devices 1300 that may be one or more of removable, attachable, or detachable, instead of an embedded memory. As such, the available capacity of the storage device 1200 may be variable. For example, in the case where the storage device 1200 does not include even one UFS device (i.e., when all the UFS devices are detached or removed from the storage device 1200), the size of the storage space of the storage device 1200 may be at a minimum. As a new UFS device is installed in the storage device 1200, the size of the storage space of the storage device 1200 may be increased. As the storage device 1200 includes as many UFS devices as possible, the size of the storage space of the storage device 1200 may be at a maximum.

In an embodiment, the storage device 1200 may notify the host 1100 of an occurrence of an event in which a UFS device is inserted into or separated therefrom, or an event in which the size of the storage space of the storage device 1200 changes. For example, in the case where a new UFS device is inserted into the storage device 1200, the storage device 1200 may provide the host 1100 with information indicating that the new UFS device is inserted and information about the size of the increased storage space. That is, the storage device 1200 may notify the host 1100 of status information through an asynchronous event request.

For example, the status information may include information about a status of a UFS device and information about a size of a storage space. The information about a status of a UFS device may include information about the number of UFS devices installed in a storage device, information about slots into which the installed UFS devices are inserted, information about a UFS device newly installed or separated, and the like. The information about a size of a storage space may include a size of a storage space increased as a UFS device is inserted, a size of a storage space decreased as a UFS device is removed, a size of a total storage space, a size of a storage space of each of UFS devices, and the like.

In an embodiment, the storage device 1200 may transmit the status information to the host 1100. For example, when a new UFS device installed, the storage device 1200 may update a log with the status information. The storage device 1200 may transmit an asynchronous event request completion, which may be for example an asynchronous event request completion signal, to the host 1100. The host 1100 may transmit a "Get Log Page" command, which may be for example a log page request command, to the storage device 1200 in response to the asynchronous event request completion. The storage device 1200 may receive the "Get Log Page" command. The storage device 1200 may transmit, to the host 1100, log data including the status information and the "Get Log Page" completion, which may be for example a log page request completion signal. A configuration according to an embodiment of the present disclosure will be described in more detail with reference to the following drawings.

Figure 2:
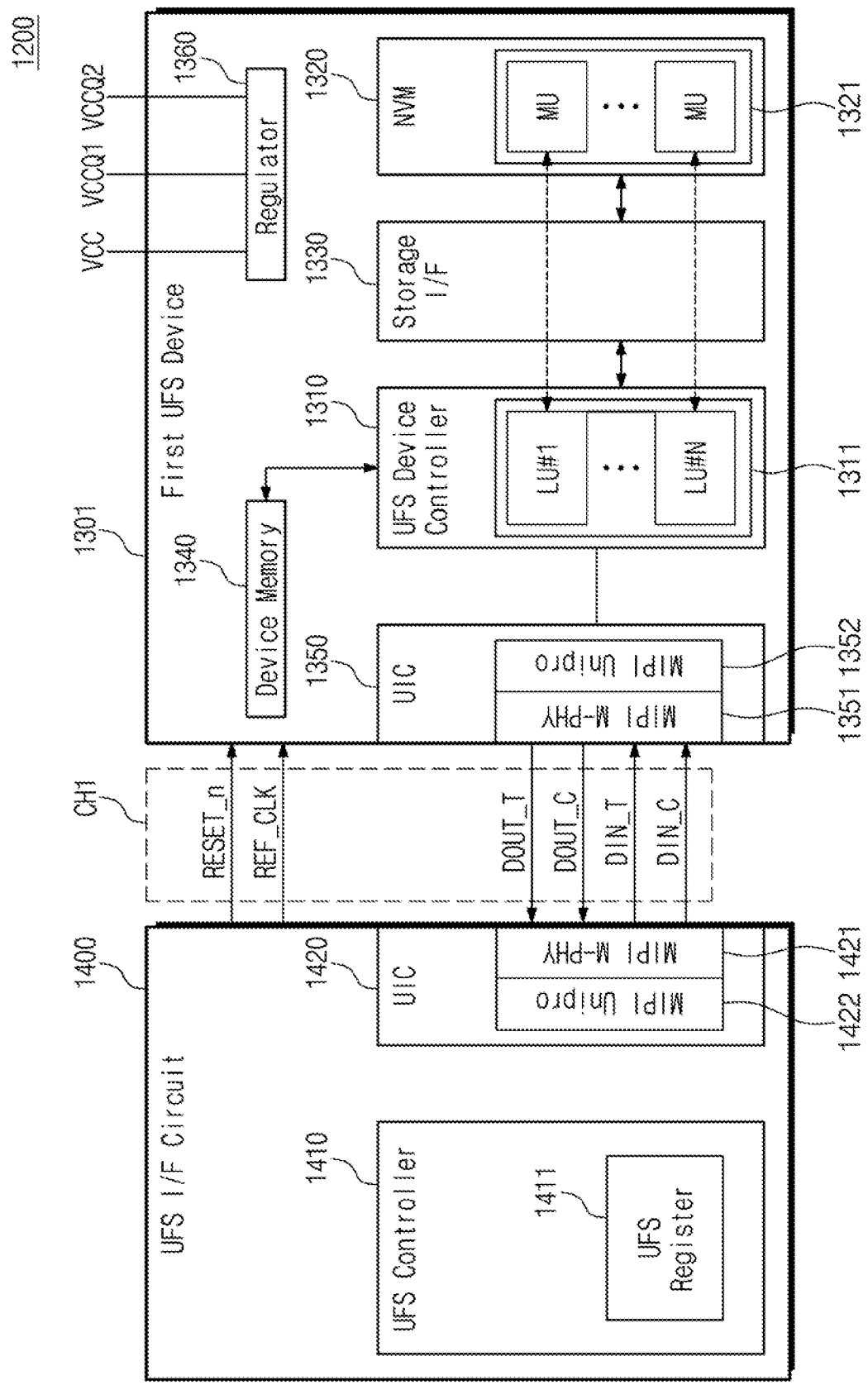
FIG. 2 is a block diagram illustrating a UFS interface circuit and a UFS device of FIG. 1 in more detail, according to an embodiment.

FIG. 2 is a block diagram illustrating a UFS interface circuit and a UFS device of FIG. 1 in detail. The UFS interface circuit 1400 and the plurality of UFS devices 1300 may communicate with each other through the UFS standard published by JEDEC. For brevity of drawing and convenience of description, only a first UFS device 1301 of the plurality of UFS devices 1300 is illustrated in FIG. 2. The remaining UFS devices of the plurality of UFS devices 1300 other than the first UFS device 1301 are not illustrated in FIG. 2, but the descriptions given with reference to the first UFS device 1301 may be applied thereto.

Referring to FIG. 2, the UFS interface circuit 1400 and the first UFS device 1301 may be connected through a first channel CH1. The UFS interface circuit 1400 may include a UFS controller 1410 and a UFS interconnect (UIC) layer 1420. The first UFS device 1301 may include a UFS device controller 1310, a nonvolatile memory 1320, a storage interface 1330, a device memory 1340, a UIC layer 1350, and a regulator 1360. The nonvolatile memory 1320 may include a plurality of memory units 1321. Each of the memory units 1321 may include a 2D NAND flash memory or a 3D VNAND flash memory or may include heterogeneous nonvolatile memory such as a PRAM and/or an RRAM. The UFS device controller 1310 and the nonvolatile memory 1320 may be interconnected through the storage interface 1330. The storage interface 1330 may be implemented to comply with the standard protocol such as Toggle or Open NAND Flash Interface (ONFI).

The UFS controller 1410 may convert an input-output request into a UFS command defined by the UFS standard. The UFS controller 1410 may transmit the UFS command thus converted to the UIC layer 1350 of the first UFS device 1301 through the UIC layer 1420 and the first channel CH1. In this process, a UFS host register 1411 of the UFS controller 1410 may perform a role of a command queue (CQ).

The LAC layer 1420 of the UFS interface circuit 1400 may include a Mobile Industry Processor Interface (MPI) M-PHY interface, for example MIPI M-PHY 1421 and a MIPI Unified Protocol (UniPro) interface, such as MIPI UniPro 1422, and the UIC layer 1350 of the first UFS device 1301 may also include an MIPI M-PHY 1351 and an MIPI UniPro 1352.

The first channel CH1 may include a line transferring a reference clock REF_CLK, a line transferring a hardware reset signal RESET_n for the first UFS device 1301, a pair of lines transferring a pair of differential input signals DIN_T and DIN_C, and a pair of lines transferring a pair of differential output signals DOUT_T and DOUT_C.

A frequency value of the reference dock REF_CLK that is provided from the UFS interface circuit 1400 to the first UFS device 1301 may be one of the following frequency values: 19.2 MHz, 26 MHz, 38.4 MHz, and 52 MHz. However, the present disclosure is not limited thereto. The UFS interface circuit 1400 may change a frequency value of the reference clock REF_CLK even in operation, that is, even while data are exchanged between the UFS interface circuit 1400 and the first UFS device 1301. The first UFS device 1301 may generate clocks of various frequencies from the reference clock REF_CLK provided from the UFS interface circuit 1400, by using a phase-locked loop (PLL) or the like. Also, the UFS interface circuit 1400 may set a value of a data rate between the UFS interface circuit 1400 and the first UFS device 1301 through a frequency value of the reference clock REF_CLK. That is, a value of the data rate may be determined depending on a frequency value of the reference clock REF_CLK.

The first channel CH1 may support multiple lanes, and each lane may be implemented with a pair of differential lines. For example, the first channel CH1 may include one or more receive lanes and one or more transmit lanes. In FIG. 2, a pair of lines transferring the differential input signal pair DIN_T and DIN_C may be included in a receive lane, and a pair of lines transferring the differential output signal pair DOUT_T and DOUT_C may be included in a transmit lane. One transmit lane and one receive lane are illustrated in FIG. 2, but the number of transmit lanes and the number of receive lanes may be changed.

The receive lane and the transmit lane may allow data transmission in a serial communication manner, and a structure in which the receive lane and the transmit lane are separated from each other makes it possible for the UFS interface circuit 1400 and the first UFS device 1301 to communicate with each other in a full-duplex manner. That is, even while the first UFS device 1301 receives data from the UFS interface circuit 1400 through the receive lane, the first UFS device 1301 may transmit data to the UFS interface circuit 1400 through the transmit lane. Also, control data (e.g., a command) from the UFS interface circuit 1400 to the first UFS device 1301, and user data that the UFS interface circuit 1400 intends to store in the nonvolatile memory 1320 of the first UFS device 1301 or intends to read from the nonvolatile memory 1320 may be provided through the same lane. As such, except for one receive lane and one transmit lane, a separate lane for data transmission does is not required further between the UFS interface circuit 1400 and the first UFS device 1301.

The UFS device controller 1310 of the first UFS device 1301 may control an overall operation of the first UFS device 1301. The UFS device controller 1310 may manage the nonvolatile memory 1320 through a logical unit (LU) 1311 being a logical data storage unit. The number of logical units 1311 may be "8", but the present disclosure is not limited thereto. The UFS device controller 1310 may include a flash translation layer (FTL), and may translate a logical data address provided from the UFS interface circuit 1400, for example, a logical block address (LBA) into a physical data address, for example, a physical block address (PBA) by using address mapping information of the FTL. A logical block for storing user data may have a size of a given range. For example, a minimum size of the logical block may be set to 4 kilobytes.

When a command from the UFS interface circuit 1400 is input to the first UFS device 1301 through the UIC layer 1350, the UFS device controller 1310 may perform an operation corresponding to the input command; when the operation is completed, the UFS device controller 1310 may transmit a completion response to the UFS interface circuit 1400.

As an example, when the UFS interface circuit 1400 intends to store user data in the first UFS device 1301, the UFS interface circuit 1400 may transmit a data write (or store) command to the first UFS device 1301. When a ready-to-transfer response indicating that it is ready to transmit user data is received from the first UFS device 1301, the UFS interface circuit 1400 may transmit the user data to the first UFS device 1301. The UFS device controller 1310 may temporarily store the provided user data in the device memory 1340, and may store the user data temporarily stored in the device memory 1340 at a selected location of the nonvolatile memory 1320 based on the address mapping information of the FTL.

As another example, when the UFS interface circuit 1400 intends to read the user data stored in the first UFS device 1301, the UFS interface circuit 1400 may transmit a data read command to the first UFS device 1301. In response to the data read command, the UFS device controller 1310 may read the user data from the nonvolatile memory 1320 and may temporarily store the read user data in the device memory 1340. In the read process, the UFS device controller 1310 may detect and correct an error of the read user data by using an embedded error correction code (ECC) engine. In more detail, the ECC engine may generate parity bits for write data to be written in the nonvolatile memory 1320, and the parity bits thus generated may be stored in the nonvolatile memory 1320 together with the write data. When data are read from the nonvolatile memory 1320, the ECC engine may correct an error of the read data by using parity bits read from the nonvolatile memory 1320 together with the read data and may output the error-corrected read data.

The UFS device controller 1310 may transmit the user data temporarily stored in the device memory 1340 to the UFS interface circuit 1400. In addition, the UFS device controller 1310 may further include an advanced encryption standard (AES) engine. The AES engine may perform at least one of an encryption operation and a decryption operation on data input to the UFS device controller 1310 by using a symmetric-key algorithm.

The UFS interface circuit 1400 may sequentially store commands to be transmitted to the first UFS device 1301 in a UFS host register 1411, which is capable of functioning as a command queue, and may transmit the commands to the first UFS device 1301 depending on the order of storing the commands. In this case, even while a previous command is still being processed by the first UFS device 1301, that is, even before the notification indicating that the previous command is completely processed by the first UFS device 1301 is received, the UFS interface circuit 1400 may transmit a next command pending in the command queue to the first UFS device 1301, and the first UFS device 1301 may also receive the next command from the UFS interface circuit 1400 even while processing the previous command. The maximum number of commands capable of being stored in the command queue, that is, a queue depth may be, for example, 32. Also, the command queue may implemented in a type of a circular queue indicating a start and an end of a command queue stored therein through a head pointer and a tail pointer, respectively.

Each of the plurality of memory units 1321 may include a memory cell array and a control circuit controlling an operation of the memory cell array. The memory cell array may include a two-dimensional memory cell array or a three-dimensional memory cell array. The memory cell array may include a plurality of memory cells. Each of the memory cells may be a single level cell (SLC) storing 1-bit information, but the present disclosure is not limited thereto. For example, each memory cell may be a cell, which stores information of 2 or more bits, such as a multi-level cell (MLC), a triple level cell (TLC), or a quadruple level cell (QLC). The three-dimensional memory cell array may include a vertical NAND string vertically oriented such that at least one memory cell is located above another memory cell.

The first UFS device 1301 may receive VCC, VCCQ1, VCCQ2, and the like as power supply voltages. The power supply voltage VCC may be a main power supply voltage for the first UFS device 1301 may have a value of 2.4 to 3.6 V. The power supply voltage VCCQ1 may be a power supply voltage for supplying a voltage of a low range may be mainly for the UFS device controller 1310 and may have a value of 1.14 to 1.26 V. The power supply voltage VCCQ2 may be a power supply voltage for supplying a voltage of a range lower than the power supply voltage VCC and higher than the power supply voltage VCCQ1 may mainly be for an input/output interface such as the MIPI M-PHY 1351 and may have a value of 1.7 to 1.95 V. The power supply voltages VCC, VCCQ1, and VCCQ2 may be supplied to respective components of the first UFS device 1301 through the regulator 1360. The regulator 1360 may be implemented with a set of unit regulators, which are respectively connected with the above power supply voltages VCC, VCCQ1, and VCCQ2 (i.e., the unit regulators may be connected with different power supply voltages, respectively).

As described above, UFS interface circuit 1400 may communicate with the UFS devices 1300 based on a universal flash storage (UFS) interface defined by the JEDEC standard. For example, the UFS interface circuit 1400 and the UFS devices 1300 may exchange packets in the form of a UFS protocol information unit (UPIU). The UPIU may include a variety of information defined by an interface (e.g., a UFS interface) between the host 1100 and the UFS devices 1300. However, the present disclosure is not limited thereto. Below, for convenience of description, the terms "command", "UPIU", and data may be interchangeably used and may be used as the same meaning or different meanings depending on embodiments disclosed in the detailed description.

Figure 3A:
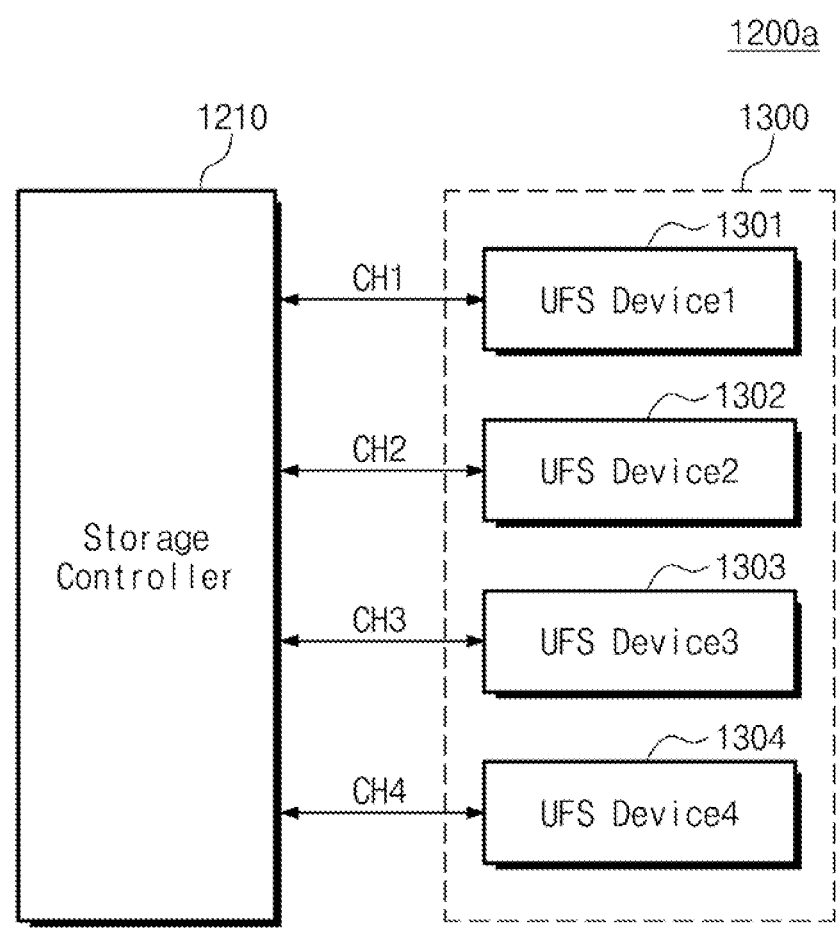
FIGS. 3A and 3B are block diagrams illustrating a storage device of FIG. 1 in more detail, according to an embodiment.
Figure 3B:
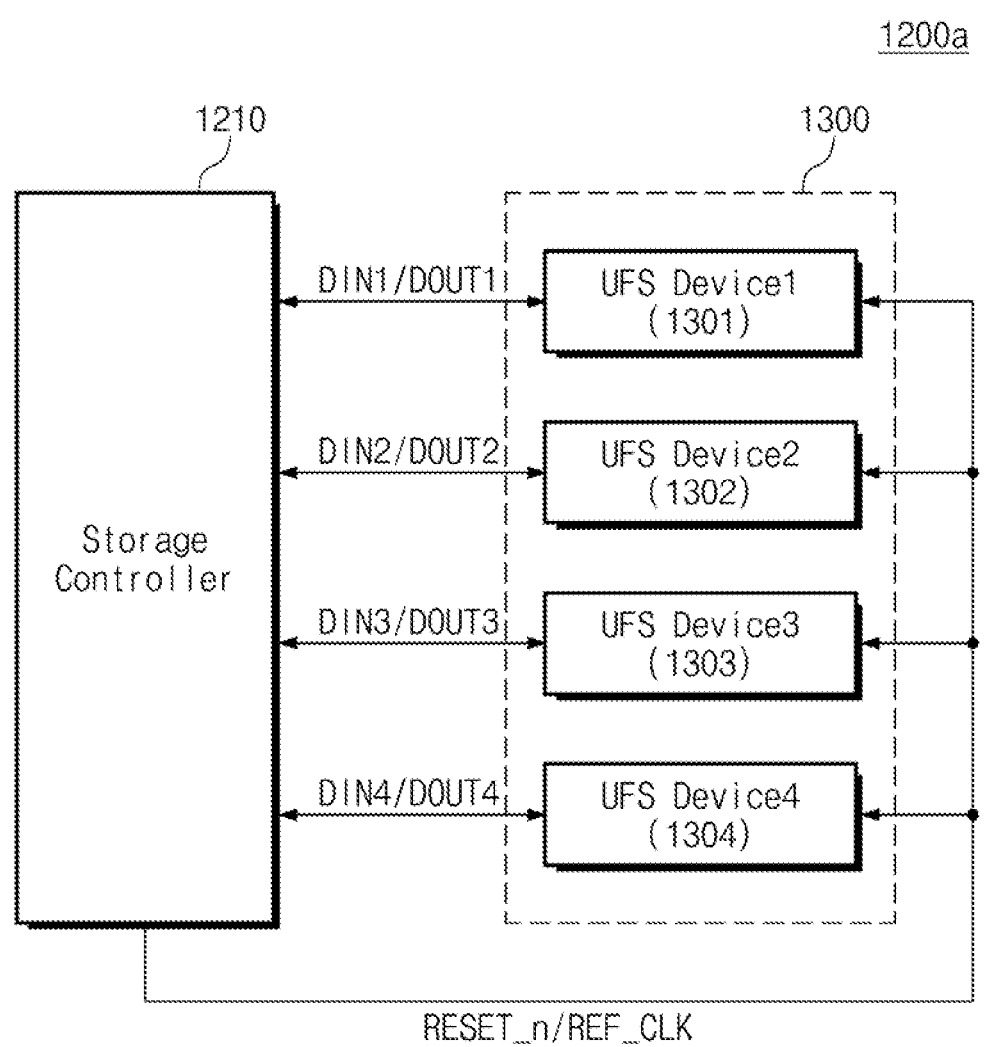

FIGS. 3A and 3B are block diagrams illustrating a storage device of FIG. 1 in more detail. Referring to FIGS. 3A and 3B, a storage device 1200*a* may include the storage controller 1210 and the plurality of UFS devices 1300. The plurality of UFS devices 1300 may include 4 UFS devices 1301 to 1304, which may be for example first UFS device 1301, second UFS device 1302, third UFS device 1303, and fourth UFS device 1304. However, the present disclosure is not limited thereto. For example, the number of UFS devices 1300 may increase or decrease depending on implementation.

The storage controller 1210 may exchange signals with the UFS devices 1300 through a plurality of channels CH1 to CH4. For example, the storage controller 1210 may transmit commands, data, or UPIUs to the UFS devices 1300 through the channels CH1 to CH4 or may receive data from the UFS devices 1300 through the channels CH1 to CH4.

Referring to FIG. 3A, in an embodiment, each of the plurality of UFS devices 1300 may be connected with the storage controller 1210 through the corresponding channel without sharing a channel. For example, the first UFS device 1301 may be connected with the storage controller 1210 through the first channel CH1; the second UFS device 1302 may be connected with the storage controller 1210 through the second channel CH2; the third UFS device 1303 may be connected with the storage controller 1210 through the third channel CH3; the fourth UFS device 1304 may be connected with the storage controller 1210 through the fourth channel CH4.

Each of the plurality of channels CH1 to CH4 may include a line transferring the reference clock REF_CLK, a line transferring the hardware reset signal RESET_n for each of the UFS devices 1300, a pair of lines transferring a pair of differential input signals DIN_T and DIN_C, and a pair of lines transferring a pair of differential output signals DOUT_T and DOUT_C.

As described above, each of the first to fourth UFS devices 1301 to 1304 may receive the corresponding reference clock REF_CLK and the corresponding hardware reset signal RESET_n through the corresponding lines. For example, the first UFS device 1301 may receive a first reference clock through a first line, and the second UFS device 1302 may receive a second reference clock through a second line. The first UFS device 1301 may receive a first hardware reset signal through a third line, and the second UFS device 1302 may receive a second hardware reset signal through a fourth line.

The storage controller 1210 may individually control the plurality of UFS devices 1300 in parallel through different channels. That is, simultaneous communication is possible through a structure in which channels connecting the storage controller 1210 with the plurality of UFS devices 1300 are separated from each other. For example, the storage controller 1210 may exchange data with the second UFS device 1302 through the second channel CH2 while exchanging data with the first UFS device 1301 through the first channel CH1.

Referring to FIG. 3B, in an embodiment, the plurality of UFS devices 1300 may share the line transferring the reference clock REF_CLK and the line transferring the hardware reset signal RESET_n.

For example, each of the first to fourth UFS devices 1301 to 1304 of FIG. 3B may receive the reference clock REF_CLK through the first line, and each of the first to fourth UFS devices 1301 to 1304 may receive the hardware reset signal RESET_n through the third line.

Each of the first to fourth UFS devices 1301 to 1304 may transmit and receive the remaining signals other than the reference clock REF_CLK and the hardware reset signal RESET_n through the corresponding lines. That is, each of the first to fourth UFS devices 1301 to 1304 may be connected with the storage controller 1210 through corresponding input/output signals.

For example, the first UFS device 1301 may be connected with the storage controller 1210 through a first input signal DIN1 and a first output signal DOUT1; the second UFS device 1302 may be connected with the storage controller 1210 through a second input signal DIN2 and a second output signal DOUT2; the third UFS device 1303 may be connected with the storage controller 1210 through a third input signal DIN3 and a third output signal DOUT3; the fourth UFS device 1304 may be connected with the storage controller 1210 through a fourth input signal DIN4 and a fourth output signal DOUT4. The first input signal DIN1 may include a pair of different input signals, and the first output signal DOUT1 may include a pair of differential output signals. The remaining input signals DIN2 to DIN4 and the remaining output signals DOUT2 to DOUT4 are similar to those described above, and thus, additional description will be omitted to avoid redundancy.

As described above, the plurality of UFS devices 1300 of FIG. 3B may share the hardware reset signal RESET_n and the reference clock REF_CLK and may not share an input signal and an output signal.

Figure 4:
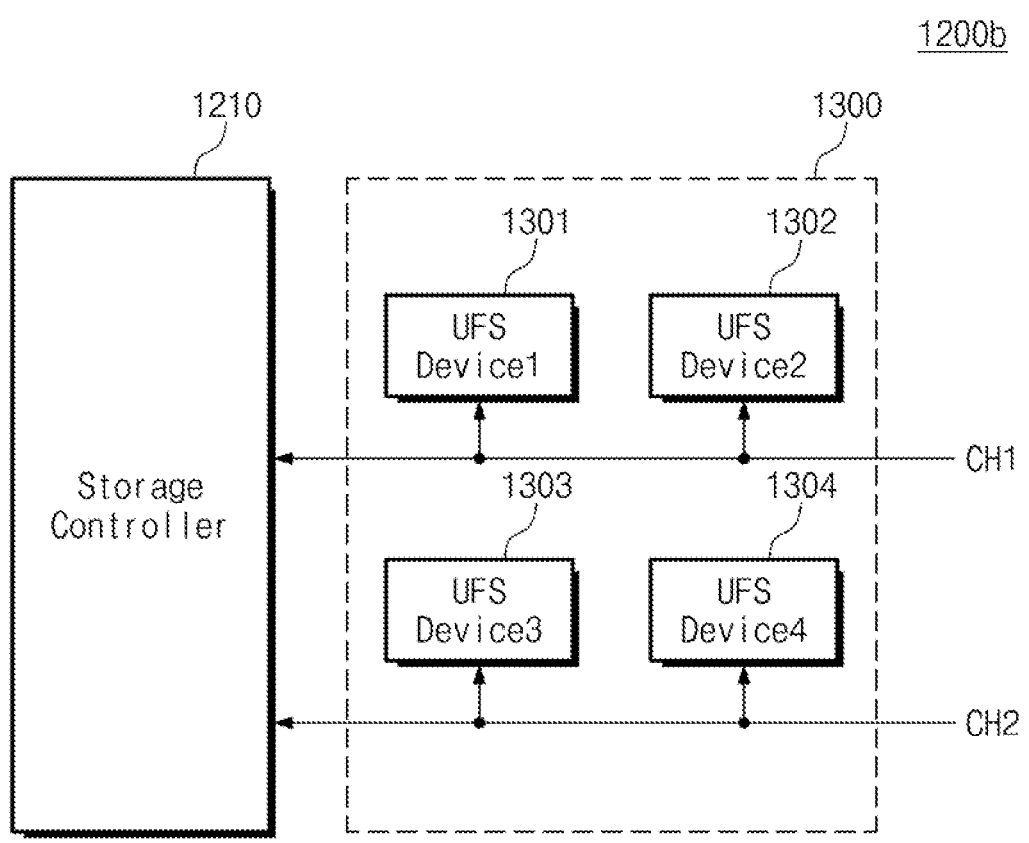
FIG. 4 is a block diagram illustrating a storage device of FIG. 1 in more detail, according to an embodiment.

FIG. 4 is a block diagram illustrating a storage device of FIG. 1 in more detail. Referring to FIG. 4, a storage device 1200b may include the storage controller 1210 and the plurality of UFS devices 1300. The plurality of UFS devices 1300 may include the 4 UFS devices 1301 to 1304. However, the present disclosure is not limited thereto. For example, the number of UFS devices 1300 and the number of UFS devices connected with one channel may increase or decrease depending on the way to implement.

Referring to FIG. 4, the storage controller 1210 may exchange signals with the UFS devices 1300 through a plurality of channels CH1 and CH2. For example, the storage controller 1210 may transmit commands, data, or UPIUs to the UFS devices 1300 through the channels CH1 and CH2 or may receive data from the UFS devices 1300 through the channels CH1 and CH2.

In an embodiment, the plurality of UFS devices 1300 may share a channel. For example, the first and second UFS devices 1301 and 1302 may be connected with the storage controller 1210 through the first channel CH1. The third and fourth UFS devices 1303 and 1304 may be connected with the storage controller 1210 through the second channel CH2.

Each of the first and second channels CH1 and CH2 may include a line transferring the reference clock REF_CLK, a line transferring the hardware reset signal RESET_n for the UFS devices 1300, a pair of lines transferring a pair of differential input signals DIN_T and DIN_C, and a pair of lines transferring a pair of differential output signals DOUT_T and DOUT_C.

In an embodiment, through each channel, the storage controller 1210 may select one of UFS devices connected with the corresponding channel and may exchange data with the selected UFS device. For example, the storage controller 1210 may select the first UFS device 1301 of the UFS devices 1301 and 1302 connected with the first channel CH1. Through the first channel CH1, the storage controller 1210 may transmit a command, data, an UPIU, and the like to the first UFS device 1301 thus selected or may receive data from the first UFS device 1301 thus selected. The storage controller 1210 may be incapable of exchanging data with the second UFS device 1302 through the first channel CH1 while exchanging data with the first UFS device 1301 through the first channel CH1.

The storage controller 1210 may exchange signals with the UFS devices 1300 through different channels in parallel. For example, the storage controller 1210 may transmit a command to the third UFS device 1303 through the second channel CH2 while transmitting a command to the first UFS device 1301 through the first channel CH1. For example, the storage controller 1210 may receive data from the third UFS device 1303 through the second channel CH2 while receiving data from the first UFS device 1301 through the first channel CH1.

Unlike FIGS. 3A and 3B, because the storage device 1200b of FIG. 4 includes UFS devices sharing a channel, it may be impossible to transmit/receive signals to/from the UFS devices sharing the channel in parallel. For example, the storage controller 1210 may be incapable of transmitting a command to the second UFS device 1302 through the first channel CH1 while transmitting a command to the first UFS device 1301 through the first channel CH1. For example, the storage controller 1210 may be incapable of receiving data from the second UFS device 1302 through the first channel CH1 while receiving data from the first UFS device 1301 through the first channel CH1.

Figure 5A:
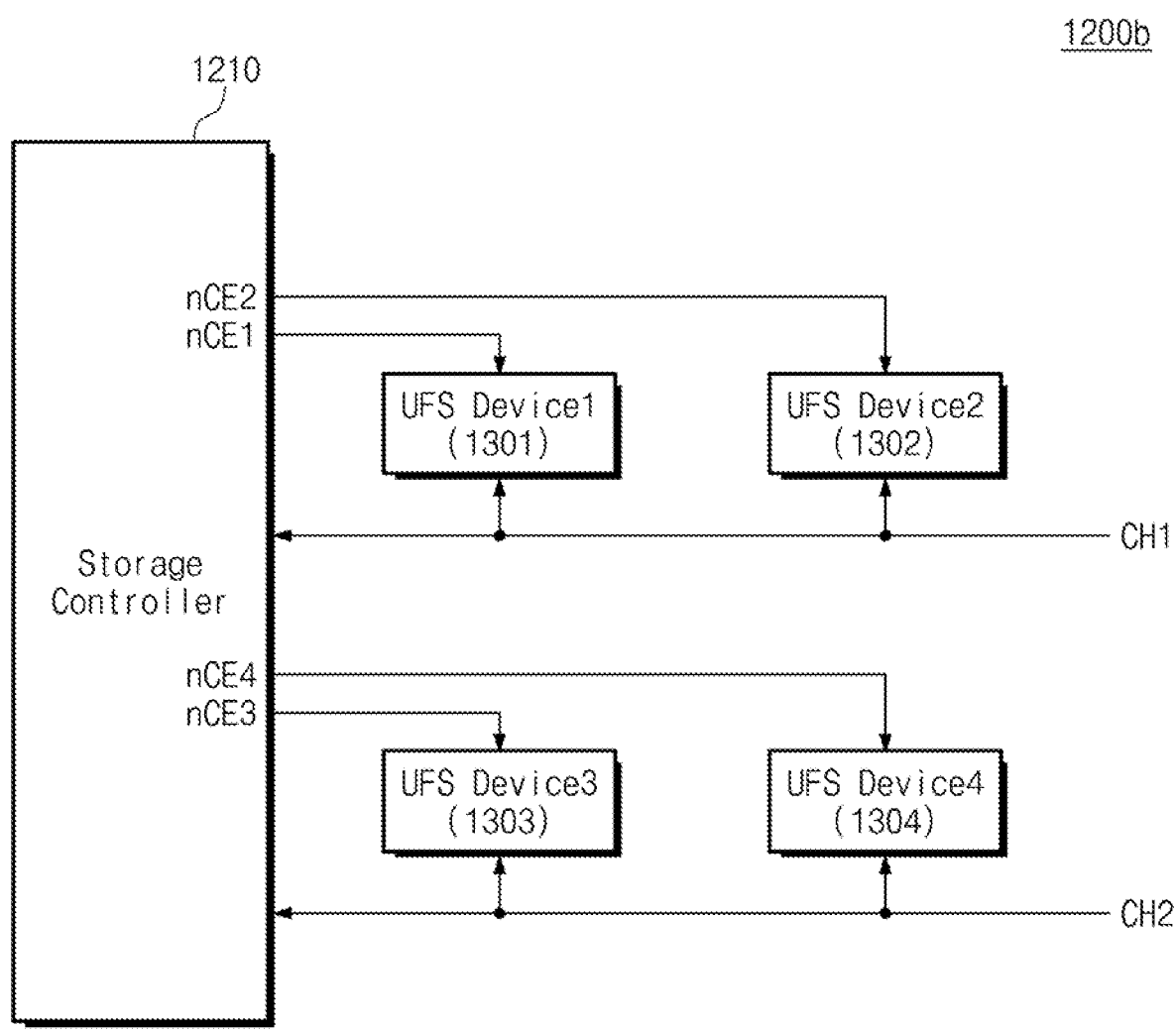
FIGS. 5A and 5B are diagrams describing a method of distinguishing UFS devices sharing a channel, in a storage device of FIG. 4, according to an embodiment.
Figure 5B:
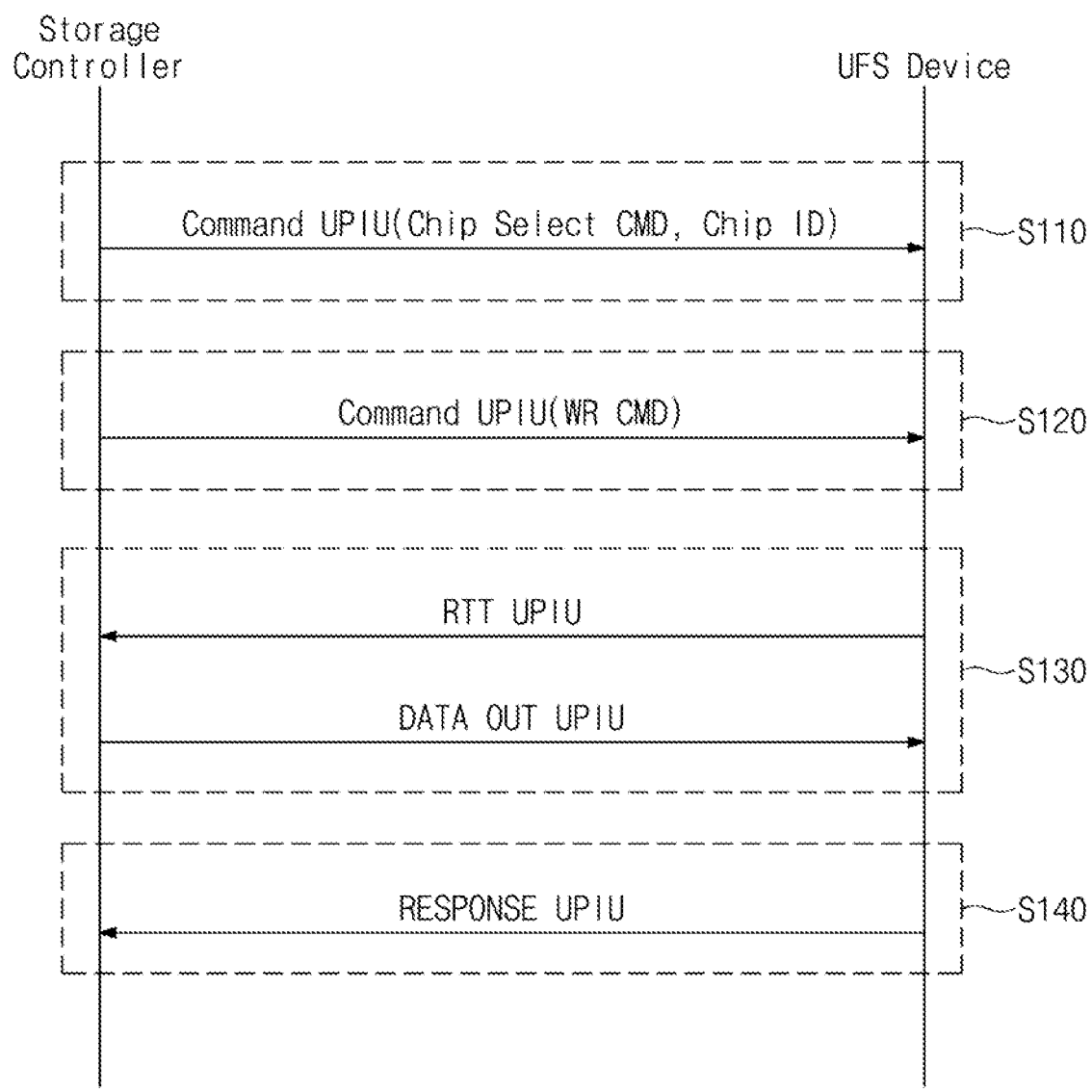

FIGS. 5A and 5B are diagrams describing a method of distinguishing UFS devices sharing a channel, in a storage device of FIG. 4. Referring to FIGS. 2, 4, and 5A, the storage device 1200b may include the storage controller 1210 and the first to fourth UFS devices 1301 to 1304. The first and second UFS devices 1301 and 1302 may communicate with the storage controller 1210 through the first channel CH1, and the third and fourth UFS devices 1303 and 1304 may communicate with the storage controller 1210 through the second channel CH2. For convenience of description, additional description associated with the components described above will be omitted to avoid redundancy.

The storage controller 1210 may further transmit chip enable signals nCE1 to nCE4 to the first to fourth UFS devices 1301 to 1304, respectively. For example, the storage controller 1210 may transmit the first chip enable signal nCE1 to the first UFS device 1301 through a first chip enable line. The storage controller 1210 may transmit the second chip enable signal nCE2 to the second UFS device 1302 through a second chip enable line. The storage controller 1210 may transmit the third chip enable signal nCE3 to the third UFS device 1303 through a third chip enable line. The storage controller 1210 may transmit the fourth chip enable signal nCE4 to the fourth UFS device 1304 through a fourth chip enable line.

In an embodiment, each of the first to fourth UFS devices 1301 to 1304 may exchange a packet with the storage controller 1210 in response to the corresponding chip enable signal. For example, when the corresponding chip enable signal is activated (e.g., to a low level), each of the first to fourth UFS devices 1301 to 1304 may exchange packets with the storage controller 1210.

In other words, the storage controller 1210 may select one of UFS devices sharing a channel, based on a chip enable signal. For example, the storage controller 1210 may select the first UFS device 1301 of the first and second UFS devices 1301 and 1302 sharing the first channel CH1. The storage controller 1210 may activate the first chip enable signal nCE1 (e.g., may set the first chip enable signal nCE1 to the low level), may deactivate the second chip enable signal nCE2 (e.g., may set the second chip enable signal nCE2 to the high level), and may transmit a command to the first UFS device 1301 through the first channel CH1 or may transmit/receive data to/from the first UFS device 1301 through the first channel CH1.

A method of selecting one of UFS devices sharing a channel through a chip select command, not a chip enable signal, will be described with reference to FIG. 5B. In an embodiment, in an initialization phase, the storage controller 1210 may set a chip identifier (ID) to each of the plurality of UFS devices 1300. For example, the storage controller 1210 may set the chip identifier of the first UFS device 1301 to "00", may set the chip identifier of the second UFS device 1302 to "01", may set the chip identifier of the third UFS device 1303 to "10", and may set the chip identifier of the fourth UFS device 1304 to "11". Each of the plurality of UFS devices 1300 may store the set chip identifier in a memory. For example, the first UFS device 1301 may store "00" as the chip identifier thereof. However, the present disclosure is not limited thereto. For example, values of the chip identifiers of the plurality of UFS devices 1300 may be changed.

In an embodiment, the host 1100 may transmit a write request and data to the storage device 1200b. The storage device 1200 may receive the write request and the data. The storage device 1200 may determine a space for storing the data, in response to the write request. For example, the storage device 1200 may select one UFS device, in which the received data are to be stored, from among the plurality of UFS devices 1300. Below, it is assumed that the storage controller 1210 stores data in the first UFS device 1301 of the plurality of UFS devices 1300.

In operation S110, the storage controller 1210 may transmit a command UPIU including the chip select command to the first device 1301. In an embodiment, the chip select command may include a chip identifier of a UFS device to be selected. For example, the storage controller 1210 may select the first UFS device 1301 for the purpose of transmitting a write command and data to the first UFS device 1301. The storage controller 1210 may transmit the chip select command including an operation code field and the chip identifier (e.g., "00") to the first UFS device 1301 through the first channel CH1.

In an embodiment, each UFS device sharing a channel may compare an assigned (or stored) chip identifier with the chip identifier included in the chip select command and may determine whether the command and data received through the channel are its own command and data, or for example a command and data intended for itself. For example, when the chip identifier included in the chip select command is "00", the first UFS device 1301 may compare the chip identifier assigned to the first UFS device 1301 with the chip identifier included in the chip select command. When the assigned chip identifier is matched with the chip identifier included in the chip select command, the first UFS device 1301 may determine that the command and data transmitted through the first channel CH1 are its own command and data, or for example a command and data intended for the first UFS device 1301. In contrast, when the assigned chip identifier (e.g., "01") is different from the chip identifier (e.g., "00") included in the chip select command, the second UFS device 1302 may determine that the command and data received through the channel are not its own command and data.

In operation S120, the storage controller 1210 may transmit a command UPIU including a write command WR CMD to the first UFS device 1301.

In operation S130, the storage controller 1210 and the first UFS device 1301 may perform a data transaction. For example, the first UFS device 1301 may transmit a ready-to-transfer UPIU (RTT UPIU) to the storage controller 1210. The RTT UPIU may include information about a data range in which the first UFS device 1301 is able to receive data. The storage controller 1210 may transmit a DATA OUT UPIU including the write data to the first UFS device 1301, in response to the RTT UPIU. As the above operations are repeatedly performed, the write data may be transmitted from the storage controller 1210 to the first UFS device 1301.

After all the write data are completely received, in operation S140, the first UFS device 1301 may transmit a RESPONSE UPIU to the storage controller 1210. The RESPONSE UPIU may include information indicating that an operation corresponding to the write command received in operation S120 is completed.

As described above, the storage controller 1210 may select one of a plurality of UFS devices sharing a channel, through a chip select command instead of using a chip enable signal nCE. After selecting a UFS device targeted for communication through a chip select command, the storage controller 1210 may transmit a write command and data to the selected UFS device.

The above embodiment is described with reference to the write operation, but the present disclosure is not limited thereto. For example, like the write operation, in a read operation, the storage controller 1210 may transmit, to a UFS device, a command UPIU including a chip select command and a chip identifier. After transmitting the chip select command to the UFS device, the storage controller 1210 may transmit a read command to the UFS device and may receive data from the UFS device.

Figure 6:
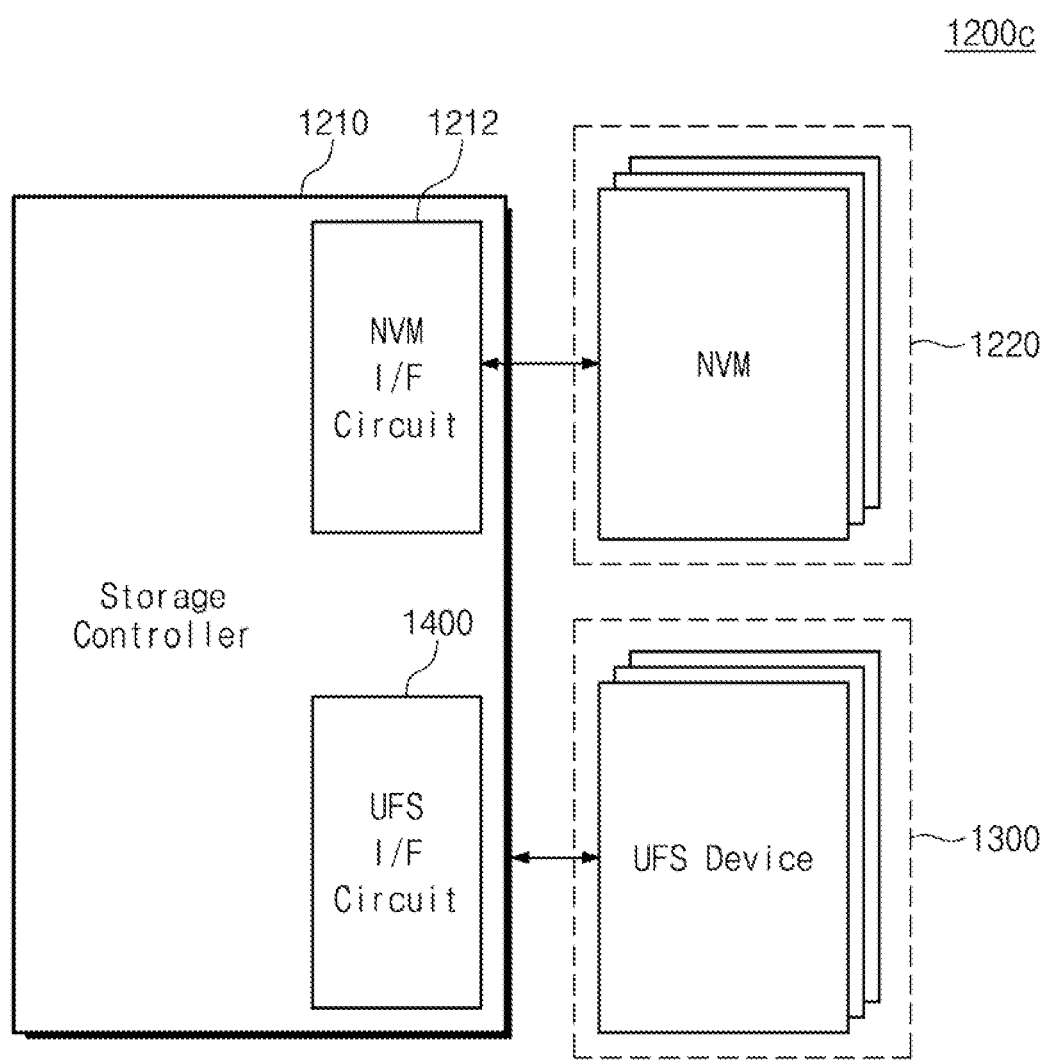
FIG. 6 is a block diagram illustrating a storage device of FIG. 1 in more detail, according to an embodiment.

FIG. 6 is a block diagram illustrating a storage device of FIG. 1 in more detail. Referring to FIGS. 1 and 6, a storage device 1200c may include the storage controller 1210, a plurality of nonvolatile memory devices 1220, and the plurality of UFS devices 1300. For brevity of drawing and convenience of description, additional description associated with components the same as or similar to the components described with reference to FIG. 1 will be omitted to avoid redundancy.

In an embodiment, unlike FIG. 1, the storage device 1200c may further include the embedded nonvolatile memory devices 1220 in addition to the plurality of UFS devices 1300 being removable. When each of the plurality of nonvolatile memory devices 1220 of the storage device 1200c includes a flash memory, the flash memory may include a 2D NAND flash memory array or a 3D NAND or VNAND memory array. As another example, the storage device 1200c may be implemented with various kinds of different nonvolatile memories. For example, the storage device 3200 may include an MRAM, an STT-MRAM, a CBRAM, an FeRAM, a PRAM, an RRAM, or at least one of various kinds of different memories.

In an embodiment, the storage controller 1210 may further include a nonvolatile memory interface circuit 1212. The nonvolatile memory interface circuit 1212 may provide the plurality of nonvolatile memory devices 1220 with data to be written in the plurality of nonvolatile memory devices 1220, or may receive data read from the plurality of nonvolatile memory devices 1220. The nonvolatile memory interface circuit 1212 may be implemented to comply with the standard protocol such as Toggle or ONFI.

As described above, the plurality of nonvolatile memory devices 1220 embedded in the storage device 1200c may communicate with the storage controller 1210 through the nonvolatile memory interface circuit 1212, and the plurality of UFS devices 1300 removable from the storage device 1200c may communicate with the storage controller 1210 through the UFS interface circuit 1400.

Figure 7A:
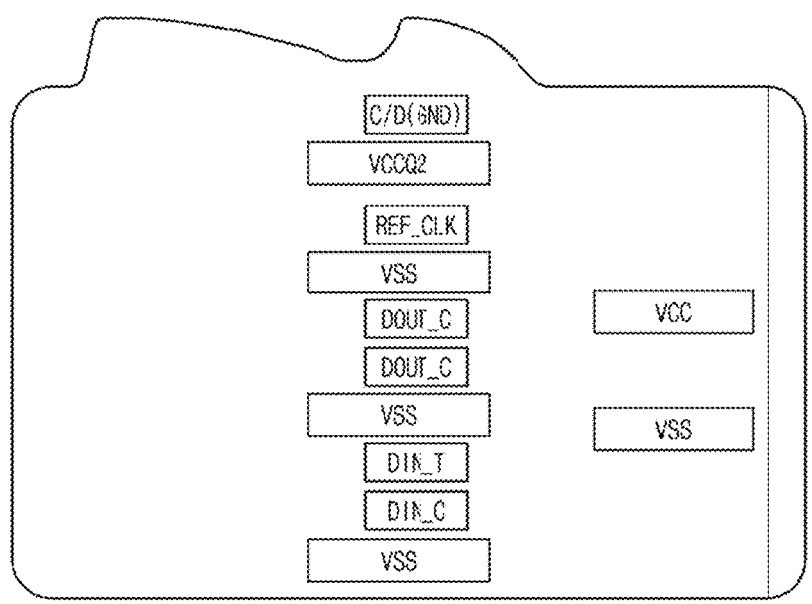
FIG. 7A is a diagram for describing a form factor of a UFS card, according to an embodiment.

FIG. 7A is a diagram of a form factor of a UFS card. When each of the plurality of UFS devices 1300 described with reference to FIG. 1 is implemented as the UFS card 2000, an outer appearance of the UFS card 2000 may be as shown in FIG. 7A.

Referring to FIG. 7A, a bottom view of the UFS card 2000 is illustrated as an example. Referring to FIG. 7A, a plurality of pins for an electrical contact with a UFS slot may be formed on a bottom surface of the UFS card 2000, and functions of the pins will be described later.

A plurality of pins for an electrical contact with the storage controller 1210 may be formed on the bottom surface of the UFS card 2000, and the number of pins illustrated in FIG. 7A may be a total of 12. Each pin may be in the shape of a rectangle, and a signal name of each pin is as shown in FIG. 7A. Table 1 below shows schematic information of each pin.

TABLE 1

| No. | Signal Name | Description |
|---|---|---|
| 1 | Vss | Ground (GND) |
| 2 | DIN_C | Differential input signals input from a host to the UFS card 2000 |
| 3 | DIN_T | (DIN_C is a negative node, and DIN_T is a positive node) |
| 4 | Vss | Ground (GND) |
| 5 | DOUT_C | Differential output signals output from the UFS card 2000 to the host |
| 6 | DOUT_T | (DOUT_C is a negative node, and DOUT_T is a positive node) |
| 7 | Vss | Ground (GND) |
| 8 | REF_CLK | Reference clock signal provided from the host to the UFS card 2000 |
| 9 | VCCQ2 | Power supply voltage provided mainly to a PHY interface or a controller and having a lower value than voltage Vcc |
| 10 | C/D(GND) | Card detection signal |
| 11 | Vss | Ground (GND) |
| 12 | Vcc | Main power supply voltage |

Figure 7B:
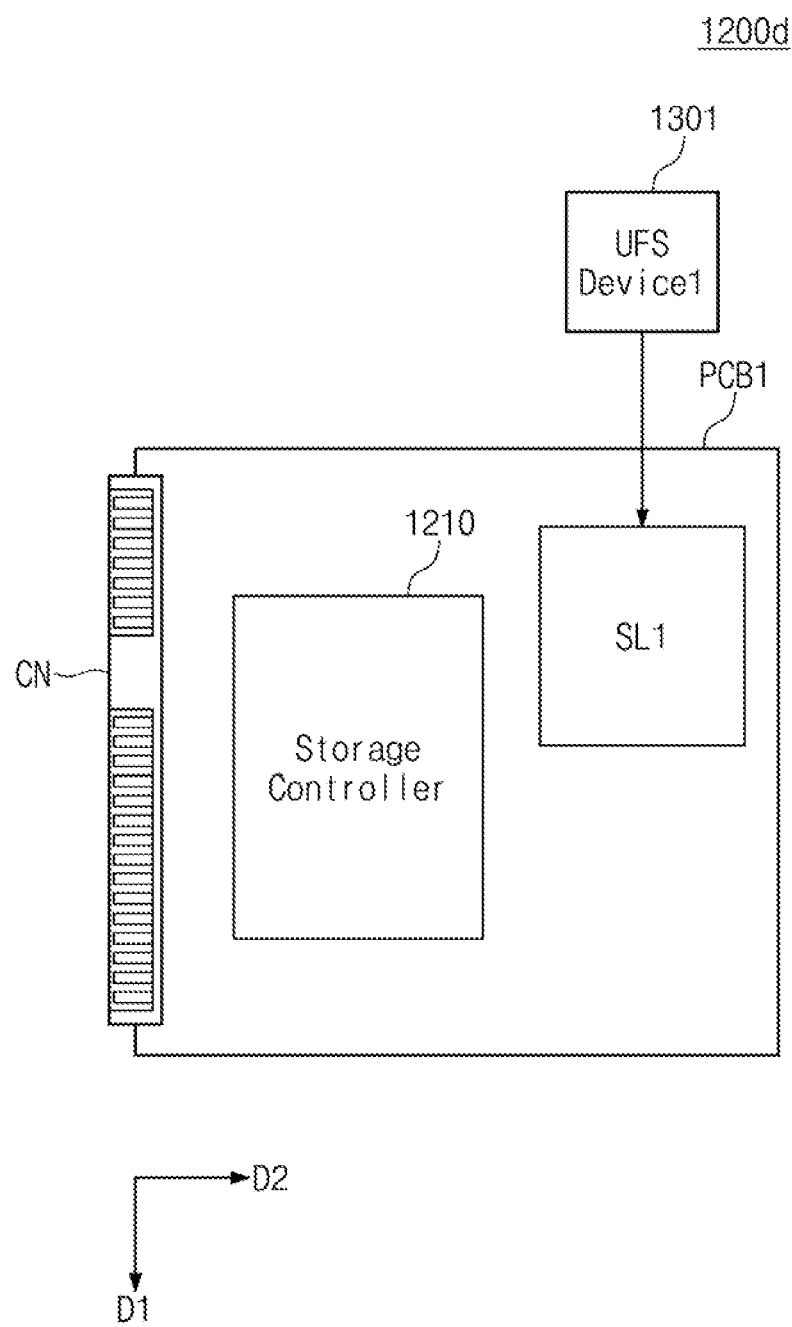
FIGS. 7B and 7C are diagrams illustrating examples of a storage device according to an embodiment.
Figure 7C:
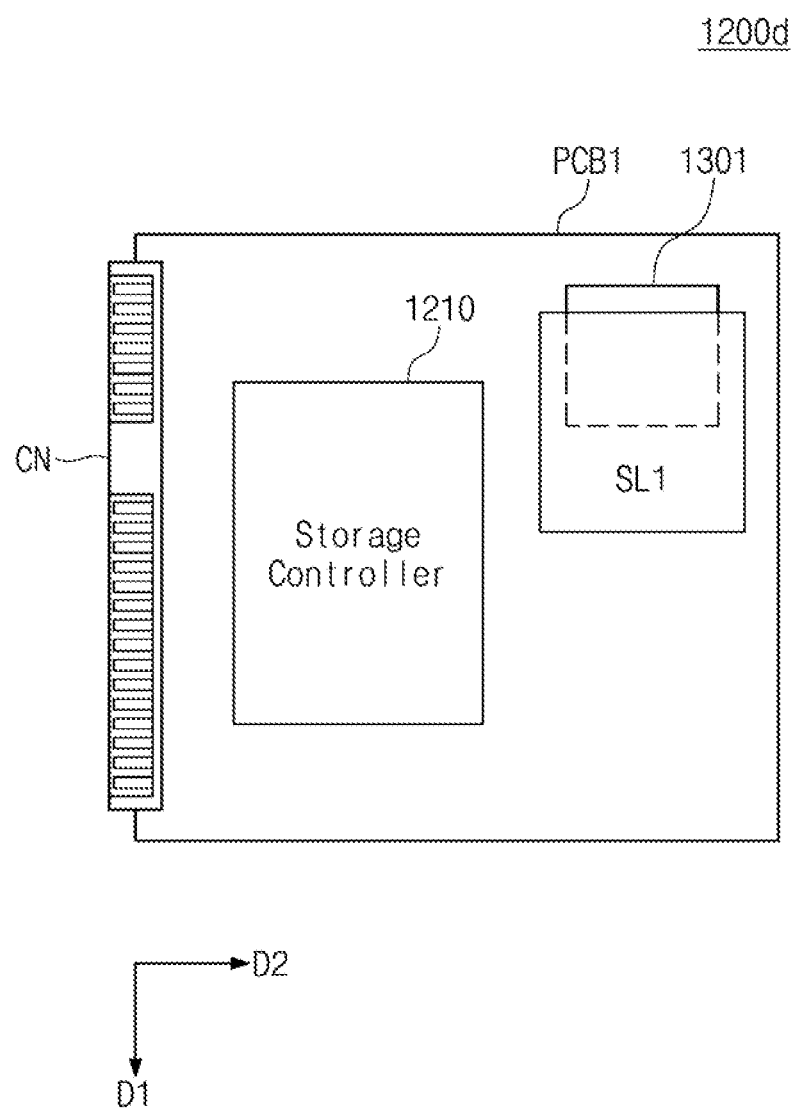

FIGS. 7B and 7C are diagrams illustrating examples of a storage device according to embodiments. For brevity of drawing, some components of a storage device are illustrated. However, the present disclosure is not limited thereto. For example, a storage device 1200d may further include any other components (e.g., a buffer memory, an additional nonvolatile memory device, and an auxiliary power supply). Referring to FIGS. 1, 7B, and 7C, the storage device 1200d may include a printed circuit board PCB1, the storage controller 1210, and the first UFS device 1301. The printed circuit board PCB1 may include a connector CN, a controller socket, and a first slot SL1. The storage controller 1210 and the first UFS device 1301 are described above, and thus, additional description will be omitted to avoid redundancy.

In an embodiment, the controller socket may refer to a region, component, or device in which the storage controller 1210 is mounted. The first slot SL1 may refer to a region, component, or device in which the first UFS device 1301 is mounted. The storage controller 1210 and the first UFS device 1301 may be connected with each other by wire patterns provided in the printed circuit board PCB1.

The printed circuit board PCB1 may include the connector CN including a plurality of pins that are coupled to the external host 1100. The number and arrangement of pins included in the connector CN may vary depending on a communication interface between the storage device 1200d and the external host 1100. For example, the storage device 1200d may communicate with the external host 1100 through one of interfaces such as Universal Serial Bus (USB), Peripheral Component Interconnect Express (PCI-Express), Serial Advanced Technology Attachment (SATA), Small Computer System Interface (SCSI), M-Phy for UFS, and the like. In particular, the SATA standard may include all SATA standards, such as SATA-2, SATA-3, and external SATA (e-SATA), in addition to SATA-1. The PCIe standard includes all PCIe standards, such as PCIe 2.0, PCIe 2.1, PCIe 3.0, and PCIe 4.0, in addition to PCIe 1.0. The SCSI standard includes all SCSI standards such as parallel SCSI, serial attached SCSI (SAS), and iSCSI. In some embodiments, the connector CN may be a connector configured to support an M.2 interface, an mSATA interface, or a 2.5" interface.

For example, the storage device 1200d may operate based on a power supplied from the external host 1100 through the connector CN. The storage device 1200d may further include a power management integrated circuit (PMIC) that distributes the power from the external host 1100 into the storage controller 1210 and the first UFS device 1301.

The storage controller 1210 may be incapable of being detached after mounted or installed in the controller socket. In contrast, the first UFS device 1301 may be disposed to be one or more of removable, detachable from the first UFS device 1301.

For example, the first UFS device 1301 may be installed in the first slot SL1 in a first direction D1. In embodiments, the first UFS device 1301 may be detached (or removed) from the first slot SL1 in a direction facing away from the first direction D1. In an embodiment, the physical and electrical connection with the first UFS device 1301 may be made only through the insertion of the first UFS device 1301 into the first slot SL1.

As illustrated in FIG. 7A, the UFS card 2000 may include a plurality of pins capable of inputting/outputting a power, a signal, and/or data. The first slot SL1 may include slot pins (or slot terminals) that are electrically connected with the plurality of pins of the UFS card 2000. The storage controller 1210 may control the data exchange with the first UFS device 1301 through the first slot SL1.

In an embodiment, the first slot SL1 may be provided such that the first UFS device 1301 is inserted therein and so as to be in contact with the first UFS device 1301. The first slot SL1 may be configured to be electrically connected with the first UFS device 1301. The first UFS device 1301 may be inserted into the first slot SL1 so as to be in contact with the slot pins and may then operate.

Figure 8:
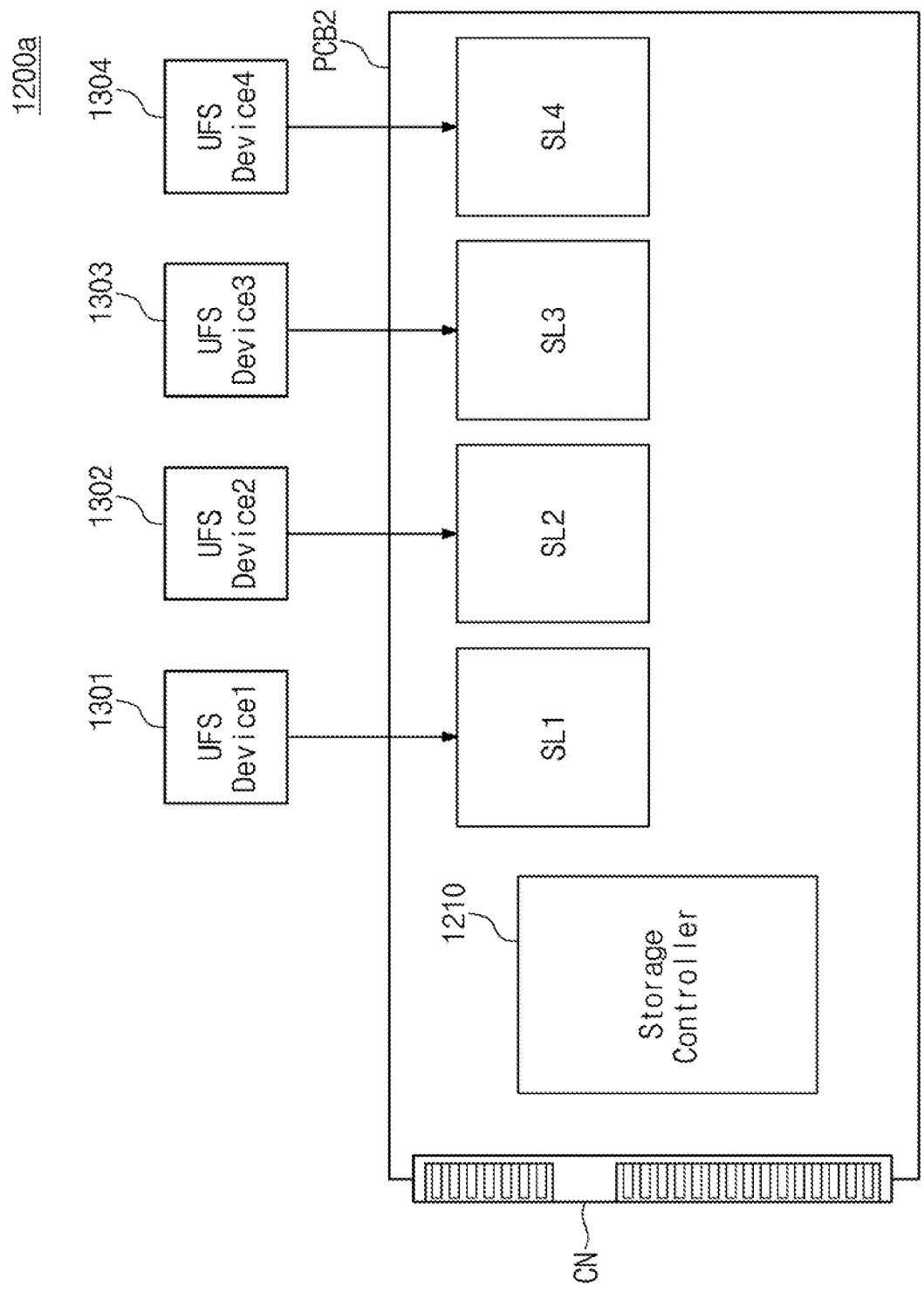
FIG. 8 is a diagram illustrating an example of a storage device according to an embodiment.

FIG. 8 is a diagram illustrating an example of a storage device according to embodiments. Referring to FIG. 8, the storage device 1200a may include the storage controller 1210, a printed circuit board PCB2, and the first to fourth UFS devices 1301 to 1304. The printed circuit board PCB2 may include a connector CN, a controller socket, and first to fourth slots SL1 to SL4. For convenience of description, additional description associated with the components described above will be omitted to avoid redundancy.

The storage device 1200d of FIGS. 7B and 7C may include one slot SL1. In embodiments, the storage device 1200a of FIG. 8 may include four slots SL1 to SL4. As such, the storage device 1200a may be configured such that the first to fourth UFS devices 1301 to 1304 are inserted therein.

In an embodiment, the storage device 1200a may include the first to fourth slots SL1 to SL4, but only the first UFS device 1301 may be inserted into the storage device 1200a. In this case, the storage device 1200a may store data received from the host 1100 only in the first UFS device

1301. The size of the storage space of the storage device 1200a may be the same as the size of the storage space of the first UFS device 1301.

Afterwards, the second UFS device 1302 may be additionally inserted into the second slot SL2. The storage device 1200a may store data received from the host 1100 in the first UFS device 1301 or the second UFS device 1302. The size of the storage space of the storage device 1200a may be the same as a sum of the size of the storage space of the first UFS device 1301 and the size of the storage space of the second UFS device 1302.

In other words, as UFS devices are additionally inserted into the storage device 1200a, the size of the storage space of the storage device 1200a may be increased. That is, the size of the storage space of the storage device 1200a may be not determined in advance, and may be variable. The size of the storage space of the storage device 1200a may be determined depending on the number of UFS devices inserted therein, a size of a storage space of each of the inserted UFS devices, and the like.

Figure 9:
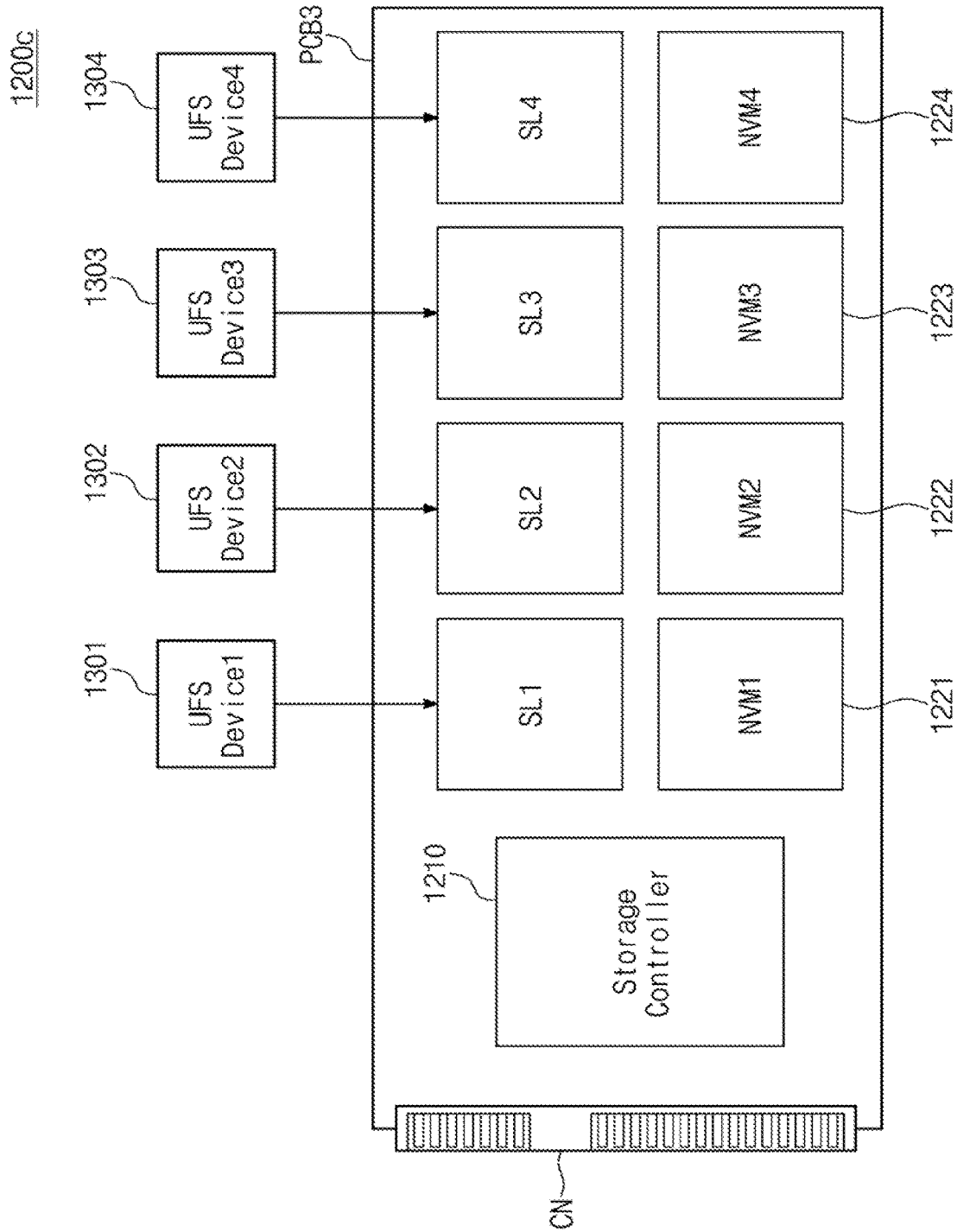
FIG. 9 is a diagram illustrating an example of a storage device according to an embodiment.

FIG. 9 is a diagram illustrating an example of a storage device according to embodiments. Referring to FIG. 9, the storage device 1200c may include the storage controller 1210, a printed circuit board PCB3, the plurality of UFS devices 1301 to 1304, and the plurality of nonvolatile memory devices 1221 to 1224. For convenience of description, additional description associated with the components described above will be omitted to avoid redundancy.

The printed circuit board PCB3 may include a connector CN, a controller socket, first to fourth slots SL1 to SL4, and first to fourth memory sockets. The memory socket may be a region, component, or device in which a nonvolatile memory device is mounted. For example, the first memory socket may be a region, component, or device in which the first nonvolatile memory device 1221 is mounted; the second memory socket may be a region, component, or device in which the second nonvolatile memory device 1222 is mounted; the third memory socket may be a region, component, or device in which the third nonvolatile memory device 1223 is mounted; the fourth memory socket may be a region, component, or device in which the fourth nonvolatile memory device 1224 is mounted.

Unlike the first to fourth UFS devices 1301 to 1304, the first to fourth nonvolatile memory devices 1221 to 1224 may be incapable of being detached (or removed). That is, each of the first to fourth nonvolatile memory devices 1221 to 1224 may be incapable of being again detached (or removed) after being mounted or installed in the corresponding memory socket during manufacturing (or mass production).

As such, the size of the storage space of the storage device 1200c may be determined depending on the first to fourth nonvolatile memory devices 1221 to 1224. For example, in the case where all the first to fourth UFS devices 1301 to 1304 are not inserted, the storage device 1200c may store data received from the host 1100 only in the first to fourth nonvolatile memory devices 1221 to 1224. In this case, the size of the storage space of the storage device 1200c may be determined depending on storage spaces of the first to fourth nonvolatile memory devices 1221 to 1224.

Afterwards, the first UFS device 1301 may be inserted into the storage device 1200c. The storage device 1200c may store data received from the host 1100 in the first UFS device 1301 as well as the first to fourth nonvolatile memory devices 1221 to 1224. As the first UFS device 1301 is inserted, the size of the storage space of the storage device 1200c may be increased.

Figure 10:
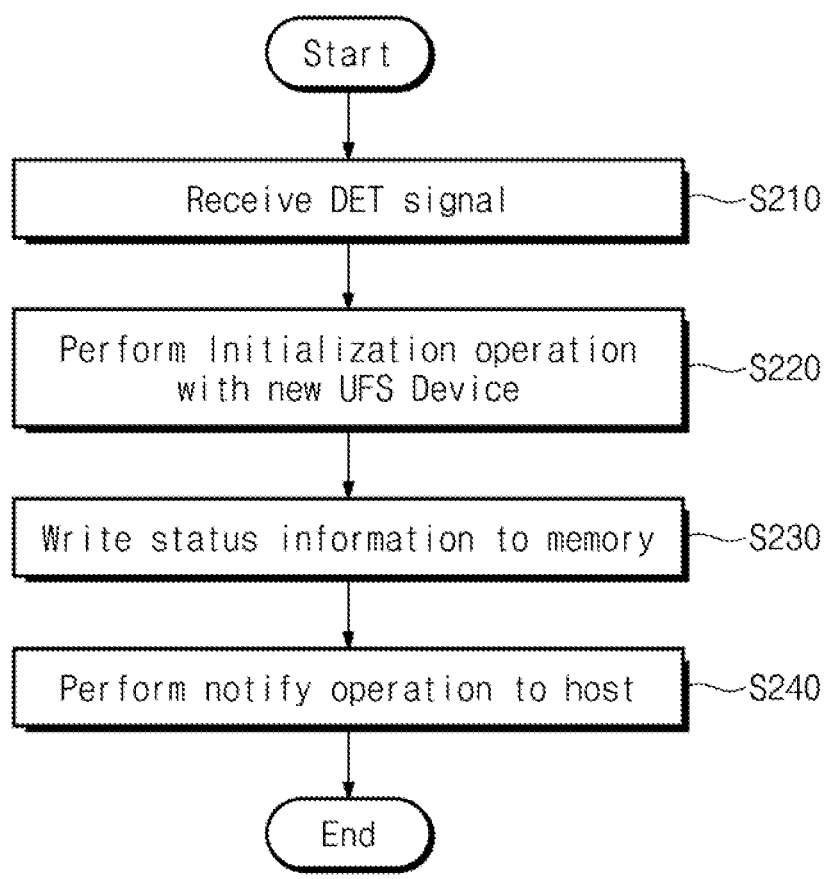
FIG. 10 is a flowchart illustrating an example of an operation of a storage controller of FIG. 1, according to an embodiment.

FIG. 10 is a flowchart illustrating an example of an operation of a storage controller of FIG. 1. An example of an operation of a storage controller when a UFS device is newly installed in the plurality of slots SL1 to SL4 will be described with reference to FIG. 10. Below, it is assumed that the first UFS device 1301 is newly installed.

Referring to FIGS. 1, 7A, and 10, in operation S210, the storage controller 1210 may receive a detection signal (e.g. DET signal). For example, the storage controller 1210 may recognize whether a new UFS device is installed, through the detection signal input through a general purpose input/output (GPIO) pin. The detection signal may refer to a signal that indicates 1) whether a new UFS device is installed in a corresponding slot, and 2) a slot, in which the new UFS device is installed, from among the plurality of slots SL1 to SL4.

In an embodiment, the storage controller 1210 may be connected with the plurality of slots SL1 to SL4 through first to fourth GPIO pins. For example, the first GPIO pin may be connected with the first slot SL1; the second GPIO pin may be connected with the second slot SL2; the third GPIO pin may be connected with the third slot SL3; the fourth GPIO pin may be connected with the fourth slot SL4. When the first UFS device 1301 is inserted into the first slot SL1, the detection signal that is input through the first GPIO pin may be activated. The remaining slots SL2 to SL4 are similar to the above description, and thus, additional description will be omitted to avoid redundancy.

In an embodiment, each of the plurality of slots SL1 to SL4 may determine whether a new UFS device is installed therein, through the card detect pin C/D of Table 1. For example, when the first UFS device 1301 is inserted into the first slot SL1, the first slot SL1 may recognize that the first UFS device 1301 is inserted, through the card detect pin C/D. The first slot SL1 may output the detection signal to the storage controller 1210 through the first GPIO pin.

In operation S220, the storage controller 1210 may perform an initialization operation with the new UFS device. For example, when the storage controller 1210 receives the detection signal through the first GPIO pin, the storage controller 1210 may recognize that the first UFS device 1301 is installed in the first slot SL1. The storage controller 1210 may perform the initialization operation in response to the detection signal, and thus it may be possible to control the first UFS device 1301.

In an embodiment, the storage controller 1210 may set a chip identifier of the new UFS device in the initialization operation. For example, the storage controller 1210 may assign a unique chip identifier to the new UFS device. The storage controller 1210 may transmit the assigned chip identifier to the new UFS device. The new UFS device may receive the assigned chip identifier from the storage controller 1210. The new UFS device may store the assigned chip identifier in a memory.

In operation S230, the storage controller 1210 may store status information in the memory after completing the initialization operation. The status information may indicate information about the plurality of UFS devices 1300 or current status information capable of being used for fault analysis. For example, the status information may include information about a status of a UFS device and information about a size of a storage space.

For example, the information about a status of a UFS device may include the number of UFS devices installed in a plurality of slots, an identifier of a slot in which a UFS device is inserted, information about a newly inserted UFS device, and the like. The information about a size of a storage space may include a size of a storage space of a newly inserted UFS device, a size of a storage space of each UFS device, and a size of the whole storage space of the storage device 1200, and the like.

The storage controller 1210 may store the status information in the buffer memory 1216 or in a UFS device being already used. In embodiments, the storage controller 1210 may include the status information in at least one of various memory devices such as a read only memory (ROM), a programmable ROM (PROM), an electrically programmable ROM (EPROM), an electronic fuse (eFuse), an electrically erasable and programmable ROM (EEPROM), a mask ROM, a serial PROM, a flash memory, a one-time programmable (OTP) memory, and a serial flash memory.

In operation S240, the storage controller 1210 may perform an operation for notification to the host 1100 (e.g., notify operation). The storage controller 1210 may transmit, to the host 1100, information about whether a UFS device is newly installed (or whether a size of a storage space is changed) and status information. For example, through the asynchronous event request completion, the storage controller 1210 may provide notification that a new UFS device is installed. In embodiments, through the asynchronous event request completion, the storage controller 1210 may provide notification that a size of a storage space of the storage device 1200 is changed. The storage controller 1210 may transmit the status information to the host 1100 through the "Get Log Page" completion.

Figure 11:
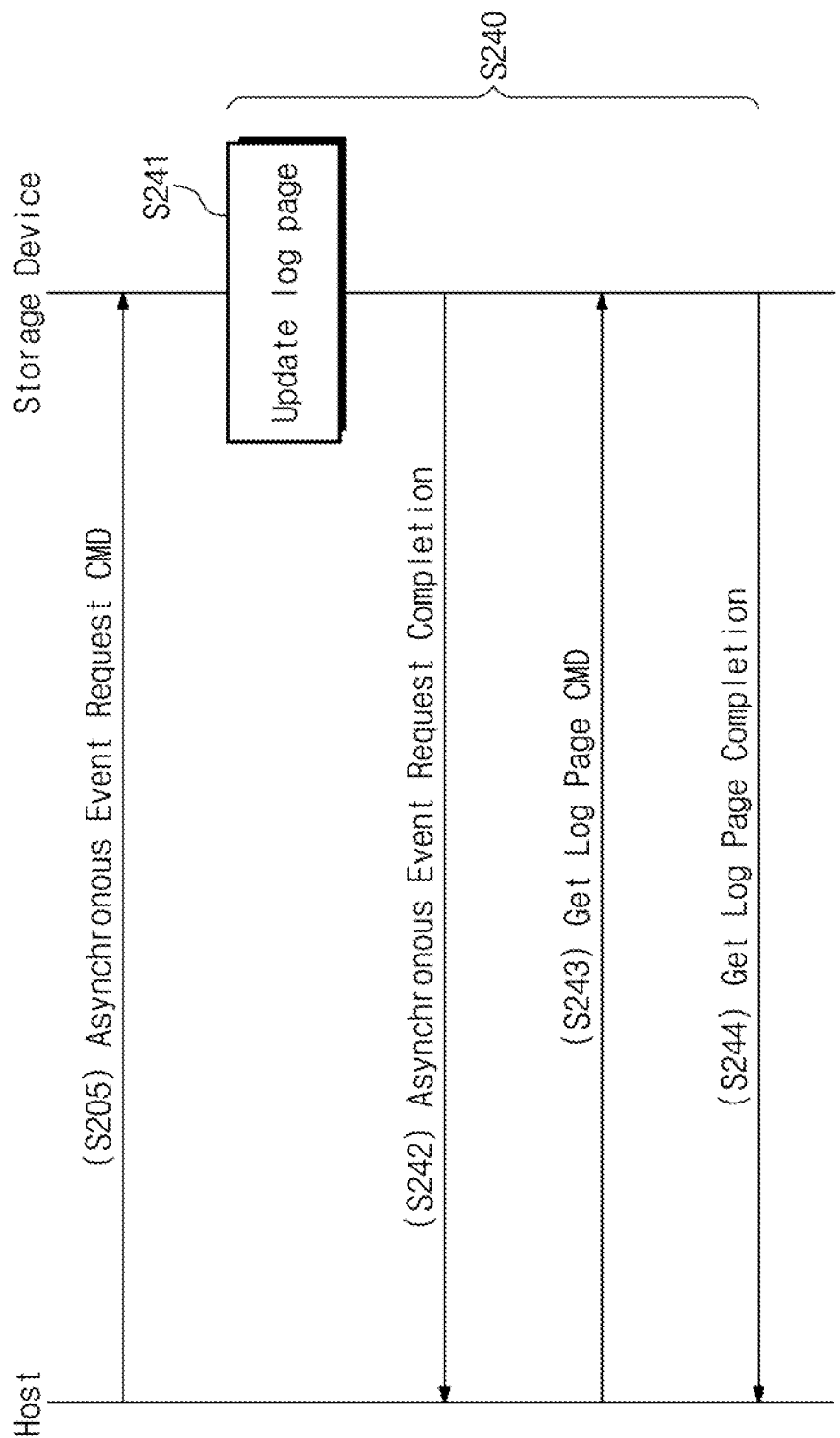
FIG. 11 is a flowchart illustrating operation S420 of FIG. 10 in more detail, according to an embodiment.

FIG. 11 is a flowchart illustrating an example of operation S240 of FIG. 10 in more detail. Referring to FIGS. 1, 2, and 11, in operation S205, the host 1100 may transmit an asynchronous event request command to the storage device 1200. The asynchronous event request command may be a timeout-free command. In the case where the storage device 1200 receives the asynchronous event request command, the storage device 1200 may not transmit a completion immediately but may transmit a completion when an event occurs.

In an embodiment, operation S205 may be performed before operation S210. Because the asynchronous event request command is a timeout-free command, the storage device 1200 may receive the asynchronous event request command before a new UFS device is installed.

When a new UFS device is installed (i.e., when an event occurs), the storage controller 1210 may perform an initialization operation on the new UFS device to prepare to use the new UFS device. The storage controller 1210 may store status information in a memory.

In operation S241, the storage device 1200 may update a log, with the status information. That is, the storage device 1200 may update the log with status information including information about UFS devices and information about a size of a storage space. Returning to FIG. 1, the log may be stored in the buffer memory 1216 of the storage controller 1210 and/or a UFS device or UFS devices already installed.

In operation S242, the storage device 1200 may transmit an asynchronous event request completion for the purpose of notifying the host 1100 that an event occurs. For example, the event may indicate a status that a new UFS device is installed or a status that a size of a storage space is changed.

In an embodiment, the asynchronous event request completion may include information about a log identifier and an event type. The storage device 1200 may allow the host 1100 to read the updated log through the asynchronous event request completion. For example, the log identifier and event type information may be newly defined with regard to installation of a UFS device (or a size change in a storage space).

In an embodiment, the storage device 1200 may transmit the asynchronous event request completion including the status information to the host 1100. In this case, a "Get Log Page" procedure to be described later may not be performed.

In operation S243, the host 1100 may transmit a "Get Log Page" command to the storage device 1200. The "Get Log Page" command may include a log identifier, a log data size, a host memory address at which log data read from the storage device 1200 is to be stored, and the like.

In operation S244, the storage device 1200 may transmit a "Get Log Page" completion. After the log data are written at the host memory address included in the "Get Log Page" command, the "Get Log Page" completion may be transmitted.

The storage device 1200 may notify the host 1100 that a UFS device is newly installed (or that a size of a storage space is changed). That is, the storage device 1200 may notify the host 1100 of statuses of UFS devices and a changed size of a storage space. As such, the host 1100 may recognize a change in a storage space of the storage device 1200 and may be provided with the status information of the storage device 1200.

As described above, the storage device 1200 according to an embodiment of the present disclosure may include a plurality of UFS devices that may be one or more of removable, detachable, and attachable. That is, a UFS card may be installed in the new form factor of the SSD. As such, the use of the UFS card may be expanded.

A storage device according to an embodiment of the present disclosure may include removable UFS devices instead of embedded nonvolatile memory devices. As such, as UFS devices are additionally inserted, the size of the storage space of the storage device may be increased. Accordingly, a storage device having an improved performance and an operation method of the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
   a printed circuit board including a connector including a plurality of pins capable of being coupled to an external host device, a controller socket, a first slot, a second slot, a third slot, and a fourth slot;
   a first universal flash storage (UFS) device, a second UFS device, a third UFS device, and a fourth UFS device, wherein each UFS device of the first to fourth UFS devices is removably installed in a corresponding slot of the first to fourth slots; and
   a storage controller mounted in the controller socket, and configured to control the first to fourth UFS devices,
   wherein the first UFS device and the second UFS device are configured to communicate with the storage controller in compliance with the UFS standard protocol through a first channel while the first channel is directly connected to the storage controller, the first UFS device is directly connected to the first channel, and the second UFS device is directly connected to the first channel, and
   wherein the third UFS device and the fourth UFS device are configured to communicate with the storage controller in compliance with the UFS standard protocol through a second channel while the second channel is directly connected to the storage controller, the third UFS device is directly connected to the second channel, and the fourth UFS device is directly connected to the second channel.

2. The storage device of claim 1, wherein the storage controller is further configured to select the first UFS device using a first chip enable signal, to select the second UFS device using a second chip enable signal, to select the third UFS device using a third chip enable signal, and to select the fourth UFS device using a fourth chip enable signal.

3. The storage device of claim 2, wherein, when a corresponding chip enable signal is activated, the each UFS device is configured to receive a command or data from the storage controller through a channel connected to the each UFS device, or to transmit data to the storage controller through the channel.

4. The storage device of claim 1, wherein the storage controller is further configured to:
receive a write command from the external host device;
receive data corresponding to the write command from the external host device based on to the received write command;
select a UFS device in which the data corresponding to the write command are to be stored, from among the first to fourth UFS devices; and
transmit a chip select command, a write command, and the data to the selected UFS device.

5. The storage device of claim 4, wherein the chip select command includes information about a chip identifier of the selected UFS device.

6. The storage device of claim 4, wherein, in an initialization operation for the first to fourth UFS devices, the storage controller is configured to set corresponding chip identifiers for the first to fourth UFS devices, and
wherein the each UFS device is configured to store a corresponding chip identifier from among the corresponding chip identifiers.

7. The storage device of claim 6, wherein the each UFS device is configured to determine whether a command or the data received through a channel belongs to the each UFS device, by comparing the stored corresponding chip identifier with the chip identifier included in the chip select command.

8. The storage device of claim 1, wherein the connector is configured to support communication with the external host device through one from among a Universal Serial Bus (USB) interface, a Peripheral Component Interconnect Express (PCI Express) interface, a Serial Advanced Technology Attachment (SATA) interface, a Small Computer System Interface (SCSI) interface, and an M-PHY for UFS interface.

9. The storage device of claim 1, wherein the storage controller includes a UFS interface circuit configured to:
control the first and second UFS devices through the first channel including a line transferring a first reference clock, a line transferring a first hardware reset signal, a pair of lines transferring a first differential input pair, and a pair of lines transferring a first differential output pair; and
control the third and fourth UFS devices through the second channel including a line transferring a second reference clock, a line transferring a second hardware reset signal, a pair of lines transferring a second differential input pair, and a pair of lines transferring a second differential output pair.

10. The storage device of claim 1, wherein the printed circuit board further includes a plurality of memory sockets, wherein the storage device further comprises a plurality of nonvolatile memory devices mounted in the plurality of memory sockets, and
wherein the plurality of nonvolatile memory devices are not removable from the plurality of memory sockets.

11. The storage device of claim 10, wherein the storage controller further includes a nonvolatile memory interface circuit configured to control the plurality of nonvolatile memory devices.

12. The storage device of claim 11, wherein the storage controller and the plurality of nonvolatile memory devices are configured to communicate in compliance with a Toggle or ONFI protocol.

13. An operation method of a storage device which includes a plurality of universal flash storage (UFS) devices which are removable from the storage device, and a storage controller, the method comprising:
receiving, by the storage controller, a detection signal based on a new UFS device of the plurality of UFS devices being inserted;
performing, by the storage controller, an initialization operation with the new UFS device in response to the detection signal;
storing, by the storage controller, status information in a memory after performing the initialization operation; and
transmitting, by the storage controller, the status information to an external host,
wherein the status information includes information about the plurality of UFS devices and information about a size of a storage space.

14. The method of claim 13, wherein the transmitting of the status information to the external host includes:
transmitting an asynchronous event request completion signal to the external host;
receiving a log page request command from the external host; and
transmitting log data including the status information and a log page request completion signal to the external host.

15. The method of claim 13, wherein the storage device further includes a printed circuit board including a controller socket in which the storage controller is mounted, and a plurality of slots in which the plurality of UFS devices are mounted, and
wherein the receiving of the detection signal includes:
determining that the new UFS device is inserted, through a card detect pin of a slot in which the new UFS device is inserted;
based on determining that the new UFS device is inserted, outputting the detection signal through a general purpose input/output (GPIO) pin connected with the slot in which the new UFS device is inserted; and
receiving, by the storage controller, the detection signal through the GPIO pin.

16. The method of claim 13, wherein the status information includes information about the size of the storage space increasing as the new UFS device is inserted.

17. The method of claim 13, wherein the performing, by the storage controller, of the initialization operation with the new UFS device in based on the detection signal includes:
assigning, by the storage controller, a chip identifier of the new UFS device; and
storing, by the new UFS device, the assigned chip identifier.

18. The method of claim 13, further comprising:

receiving a write request and data from the external host;

selecting a UFS device in which the data are to be stored, from among the plurality of UFS devices in based on the write request;

transmitting, by the storage controller, a chip select command including a chip identifier of the selected UFS device to the selected UFS device;

transmitting, by the storage controller, a write command to the selected UFS device after transmitting the chip select command;

transmitting, by the selected UFS device, a ready to transfer universal flash storage protocol information unit (UPIU) to the storage controller;

transmitting, by the storage controller, a DATA OUT UPIU, in which the data are included, to the selected UFS device in response to the ready to transfer UPIU;

receiving, by the selected UFS device, the DATA OUT UPIU, and storing the data; and transmitting, by the selected UFS device, a response UPIU to the storage controller.

19. The method of claim 18, further comprising:

before transmitting the write command, receiving, by the selected UFS device, the chip select command;

comparing, by the selected UFS device, the chip identifier included in the chip select command with a stored chip identifier in response to the chip select command; and based on the chip identifier being identical to the stored chip identifier, determining that a command and data received through a channel belong to the selected UFS device.

20. A storage device comprising:

a printed circuit board including a connector including a plurality of pins capable of being coupled to an external host device, a controller socket, a first slot, a second slot, a third slot, and a fourth slot, and a plurality of memory sockets;

a first universal flash storage (UFS) device, a second UFS device, a third UFS device, and a fourth UFS device, wherein each UFS device of the first to fourth UFS devices is removably installed in a corresponding slot of the first to fourth slots;

a plurality of nonvolatile memory devices mounted in the plurality of memory sockets; and a storage controller mounted in the controller socket, and including a UFS interface circuit configured to control the first to fourth UFS devices and a nonvolatile memory interface circuit configured to control the plurality of nonvolatile memory devices, wherein the first UFS device and the second UFS device communicate with the storage controller in compliance with a UFS standard protocol through a first channel while the first channel is directly connected to the storage controller, the first UFS device is directly connected to the first channel, and the second UFS device is directly connected to the first channel, and wherein the third UFS device and the fourth UFS device communicate with the storage controller in compliance with the UFS standard protocol through a second channel while the second channel is directly connected to the storage controller, the third UFS device is directly connected to the second channel, and the fourth UFS device is directly connected to the second channel.

* * * * *